(12) United States Patent
Takeda et al.

(10) Patent No.: US 10,644,841 B2
(45) Date of Patent: May 5, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 11 days.

(21) Appl. No.: 15/934,038

(22) Filed: Mar. 23, 2018

(65) Prior Publication Data
US 2018/0212718 A1 Jul. 26, 2018

Related U.S. Application Data

(63) Continuation of application No. PCT/JP2016/077956, filed on Sep. 23, 2016.

(30) Foreign Application Priority Data

Sep. 24, 2015 (JP) ................. 2015-186885

(51) Int. Cl.
H04W 72/04 (2009.01)
H04L 1/18 (2006.01)
H04W 24/10 (2009.01)
H04W 28/06 (2009.01)
H04L 5/00 (2006.01)

(52) U.S. Cl.
CPC .......... *H04L 1/1816* (2013.01); *H04L 1/1854* (2013.01); *H04L 1/1861* (2013.01); *H04L 5/0057* (2013.01); *H04W 24/10* (2013.01); *H04W 28/06* (2013.01); *H04W 72/04* (2013.01); *H04W 72/0413* (2013.01)

(58) Field of Classification Search
CPC ....................................................... H04L 1/18
See application file for complete search history.

(56) References Cited

U.S. PATENT DOCUMENTS

2015/0223230 A1* 8/2015 Liang ................. H04W 72/042
370/329
2016/0338041 A1* 11/2016 Li ......................... H04L 5/0055

OTHER PUBLICATIONS

Office Action issued in the counterpart Japanese Patent Application No. 2015-186885, dated Dec. 6, 2016 (15 pages).
Extended European Search Report issued in the counterpart European Patent Application No. 16848634.8, dated Jun. 5, 2018 (11 pages).

(Continued)

*Primary Examiner* — Sulaiman Nooristany
(74) *Attorney, Agent, or Firm* — Osha Liang LLP

(57) ABSTRACT

A user terminal is disclosed. The user terminal has a transmitter that transmits uplink control information (UCI) and a processor executes control to transmit at least a part of the UCI by using a specific Physical Uplink Control Channel (PUCCH) format (PF). When the UCI includes multiple periodic channel state information (P-CSI) and multiple Hybrid Automatic Repeat reQuest Acknowledgments (HARQ-ACKs), the processor controls to transmit the UCI by using a resource designated by downlink control information and a second PF having a greater capacity than PF.

4 Claims, 20 Drawing Sheets

(56) References Cited

OTHER PUBLICATIONS

Huawei, HiSilicon; "New PUCCH format design to support UCI transmission for up to 32 component carriers"; 3GPP TSG RAN WG1 Meeting #82 R1-153770; Beijing, China, Aug. 24-28, 2015 (4 pages).
CATT; "Periodic CSI feedback for up to 32 CCs"; 3GPP TSG RAN WG1 Meeting #82 R1-153914; Beijing, China, Aug. 24-28, 2015 (3 pages).
Alcatel-Lucent, Alcatel-Lucent Shanghai Bell; "CSI feedback enhancement for supporting CA with up to 32 CCs"; 3GPP TSG RAN WG1 Meeting #82 R1-154595; Beijing, China, Aug. 24-28, 2015 (3 pages).
Huawei, HiSilicon; "CSI feedback enhancement for carrier aggregation enhancement beyond 5 carriers"; 3GPP TSG RAN WG1 Meeting #80bis R1-151277; Belgrade, Serbia, Apr. 20-24, 2015 (4 pages).
International Search Report issued in International Patent Application No. PCT/JP2016/077956, dated Dec. 13, 2016 (2 pages).
Written Opinion issued in International Patent Application No. PCT/JP2016/077956, dated Dec. 13, 2016 (5 pages).
Samsung, "Coding and RE mapping for multiple UCI for eCA", 3GPP TSG RAN WG1 #82, R1-154113, Beijing, China, Aug. 24-28, 2015 (4 pages).
LG Electronics, "Periodic CSI feedback enhancement for Rel-13 CA", 3GPP TSG RAN WG1 Meeting #82, R1-154248, Beijing, China, Aug. 24-28, 2015 (4 pages).
NTT DOCOMO, Inc., "CSI feedback for CA with up to 32 CCs", 3GPP TSG RAN WG1 Meeting #82, R1-154430, Beijing, China, Aug. 24-28, 2015 (5 pages).
LG Electronics, "Periodic CSI related enhancement for Rel-13 CA", 3GPP TSG RAN WG1 Meeting #82bis, R1-155377, Malmo, Sweden, Oct. 5-9, 2015 (6 pages).
NTT DOCOMO, Inc., "P-CSI feedback enhancements for CA with up to 32 CCs", 3GPP TSG RAN WG1 Meeting #82bis, R1-155692, Malmo, Sweden, Oct. 5-9, 2015 (9 pages).
3GPP TS 36.300 V12.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2014 (251 pages).
Office Action issued in the counterpart European Patent Application No. 16848634.8, dated Apr. 23, 2019 (5 pages).

* cited by examiner

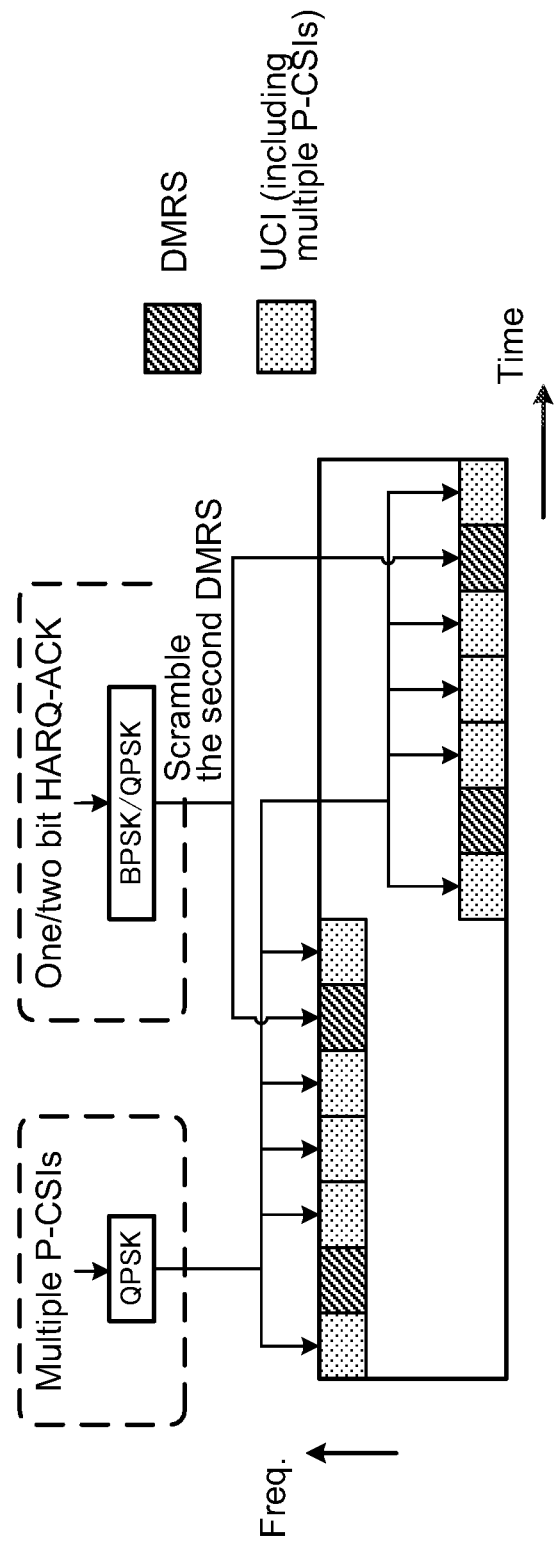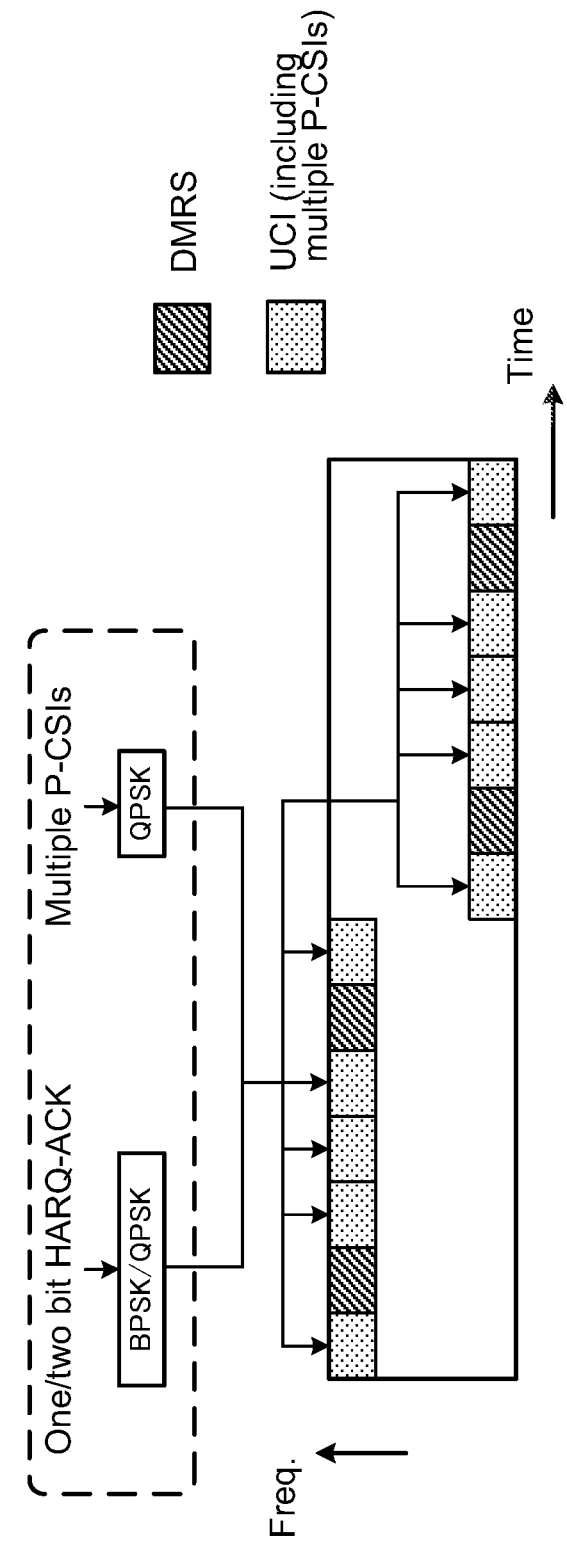

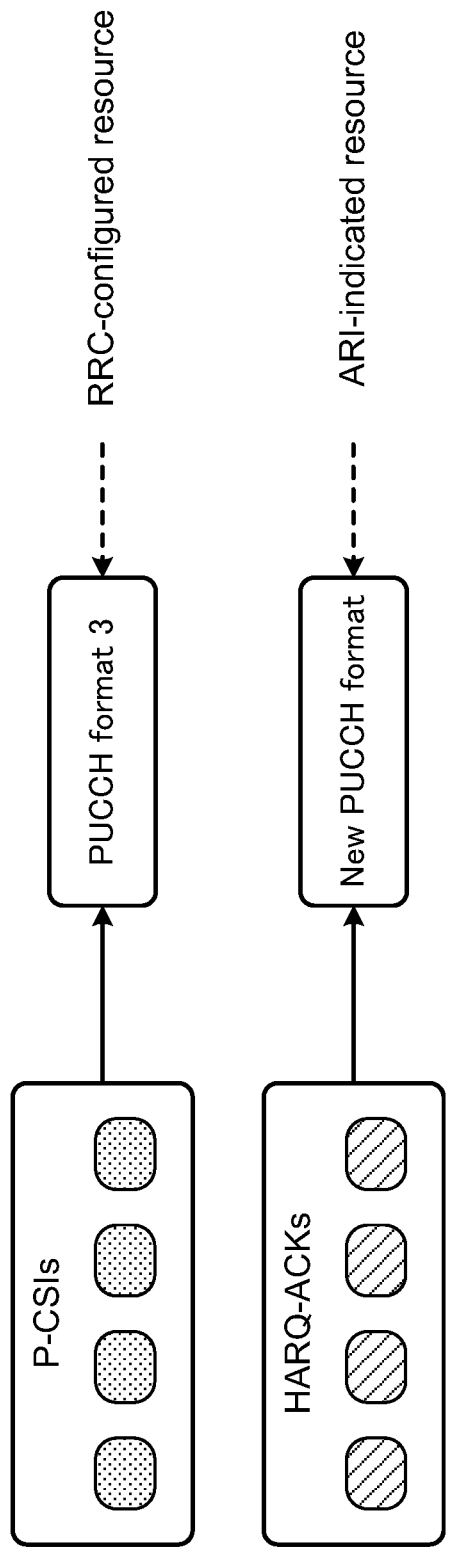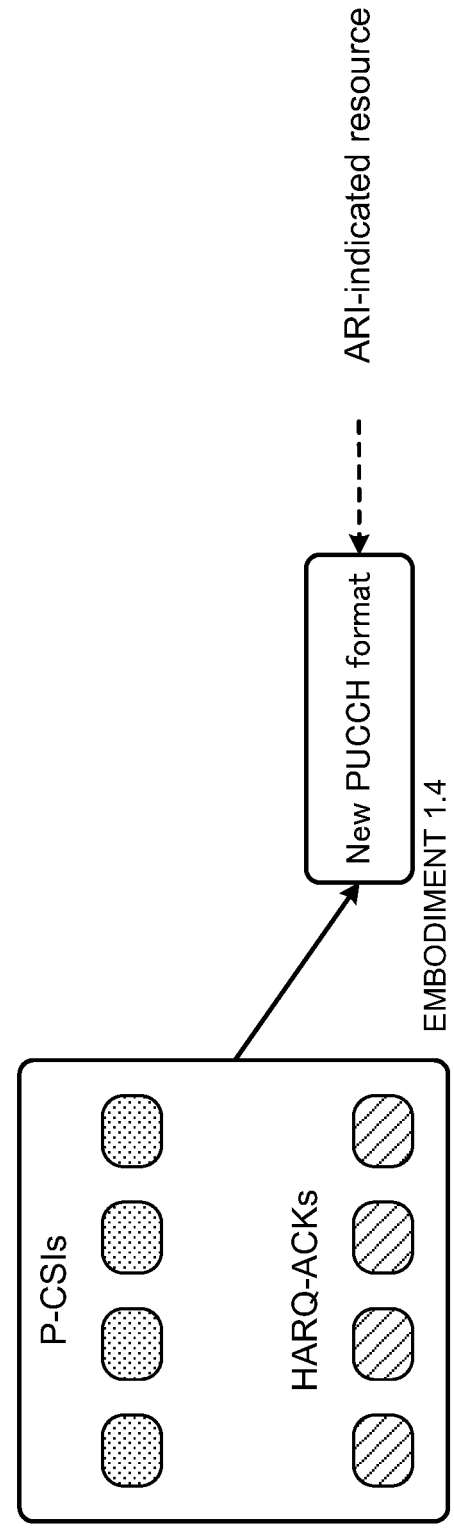

USER TERMINAL, RADIO BASE STATION AND RADIO COMMUNICATION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/077956, filed on Sep. 23, 2016, which is based on and claims the benefit of priority of Japanese Patent Application No. 2015-186885 filed on Sep. 24, 2015. The contents of the aforementioned applications are incorporated herein by reference.

FIELD OF THE INVENTION

The present invention relates to a user terminal, a radio base station and a radio communication method in next-generation mobile communication systems.

BACKGROUND

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as LTE Rel. 8 or 9), and successor systems of LTE (also referred to as, for example, "FRA" (Future Radio Access), "5G" (5th generation mobile communication system), "LTE Rel. 13" and so on) are under study. Carriers that constitute the fundamental units in carrier aggregation (CA) are referred to as "component carriers" (CCs), and are equivalent to the system band of LTE Rel. 8.

When CA is used, in a user terminal (UE: User Equipment), a primary cell (PCell: Primary Cell), which is a cell with high reliability to ensure connectivity, and a secondary cell (SCell: Secondary Cell) which is an adjunct cell, are configured.

The UE can first connect to the PCell and add the SCell if necessary. PCell is a single cell (standalone cell) that supports RLM (Radio Link Monitoring), SPS (Semi-Persistent Scheduling), and the like. SCell is a cell that is configured in UE in addition to PCell.

SCell is added and deleted by RRC (Radio Resource Control) signaling. SCell is in a deactivated state immediately after being added to UE, and can only perform communication (scheduling) after being activated.

Also, the specifications of LTE Rel. 8 to 12 have been drafted assuming exclusive operations in frequency bands that are licensed to operators (licensed bands). As licensed bands, for example, the 800 MHz, 2 GHz and/or 1.7 GHz bands are used. Meanwhile, in LTE of Rel. 13 and later versions, operation in frequency bands where license is not required (unlicensed bands) is also a target of study. For unlicensed bands, for example, the 2.4 GHz and/or the 5 GHz band are used as in Wi-Fi (registered trademark).

Although carrier aggregation (LAA: license-assisted access) between licensed bands and unlicensed bands is placed under study in Rel. 13 LTE, there is a possibility that, in the future, dual connectivity (DC) and unlicensed-band stand-alone will becomes targets of study as well.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY

In accordance with embodiments of the invention a user terminal is disclosed, the user terminal comprising: a transmitter that transmits uplink control information (UCI); and a processor executes control to transmit at least a part of the UCI by using a specific Physical Uplink Control Channel (PUCCH) format (PF), wherein, when the UCI includes multiple periodic channel state information (P-CSI) and multiple Hybrid Automatic Repeat reQuest Acknowledgments (HARQ-ACKs), the processor controls to transmit the UCI by using a resource designated by downlink control information and a second PF having a greater capacity than PF 3.

In some aspects of the user terminal, when the UCI includes multiple P-CSI, 1-bit or 2-bit HARQ-ACK, and a resource of the second PF is configured for multiple P-CSI by Radio Resource Control (RRC) signaling, the processor controls to transmit the UCI by using the resource configured for multiple P-CSI and the second PF.

In some aspects of the user terminal, when the UCI includes multiple P-CSI, does not include HARQ-ACK, and a resource of the PF of large capacity is configured for multiple P-CSI by RRC (Radio Resource Control) signaling, the control section controls to transmit the UCI by using the resource configured for multiple P-CSI and the PF of large capacity.

In some aspects of the user terminal, when the UCI includes P-CSI, the processor controls to transmit the UCI including at least one P-CSI that is selected from multiple P-CSI based on a given priority rule, by using the second PF.

In some aspects of the user terminal, when the UCI includes multiple P-CSI, 1-bit or 2-bit HARQ-ACK, and simultaneous PUCCH and Physical Uplink Shared Channel (PUSCH) transmission is configured, the processor controls to transmit the HARQ-ACK by the PUCCH and to transmit the multiple P-CSI by the PUSCH.

In accordance with embodiments of the invention a radio base station is disclosed, the radio base station comprising: a receiver that receives uplink control information (UCI); a transmitter that transmits downlink control information; and a processor executes control to receive at least a part of the UCI by using a first Physical Uplink Control Channel (PUCCH) format (PF), wherein, when the UCI includes multiple periodic channel state information (P-CSI) and multiple Hybrid Automatic Repeat reQuest Acknowledgments (HARQ-ACKs), the processor controls to receive the UCI by using a resource designated by the downlink control information and a second PF having a greater capacity than PF 3.

In accordance with embodiments of the invention, a radio communication method is disclosed, the radio communication method comprising: transmitting uplink control information (UCI); and controlling to transmit at least a part of the UCI by using a first Physical Uplink Control Channel (PUCCH) format (PF), wherein in the step of controlling, when the UCI includes multiple periodic channel state information (P-CSI) and multiple Hybrid Automatic Repeat reQuest Acknowledgments (HARQ-ACKs), the user terminal controls to transmit the UCI by using a resource designated by downlink control information and a second PF having a greater capacity than PF 3.

BRIEF DESCRIPTION OF DRAWINGS

FIGS. 4A and 4B are diagrams illustrating examples of modulation and resource mapping of PF 3 or new PFs configured for multiple P-CSIs in embodiment 1.2;

FIGS. 9A and 9B are diagrams illustrating the resources used to transmit multiple P-CSIs and multiple HARQ-ACKs in embodiment 1.4.

DETAILED DESCRIPTION

In CA in LTE Rel. 10 to 12, the number of CCs that can be configured per user terminal is limited to a maximum of five. Meanwhile, CA in and after LTE Rel. 13 is required to realize more flexible and high-speed wireless communication, and, for example, a study is in progress to introduce CA enhancement, in which the number of CCs that can be configured per UE in CA is increased, in order to bundle a large number of CCs in a ultra wideband unlicensed band. Increasing the maximum number of CCs will dramatically improve the achievable peak rates.

In CA enhancement, a study is in progress to alleviate the limit on the number of CCs that can be configured per UE and configure more than 6 CCs (more than 5 CCs). Here, carrier aggregation in which six or more CCs can be configured may be referred to as, for example, "enhanced CA," "Rel. 13 CA," and so on.

When the number of CCs that can be configured in a user terminal is expanded to six or more (for example, 32), it may be difficult to use the transmission methods of existing systems (Rel. 10 to 12) on an as-is basis.

For example, in existing systems, periodic CSI reporting (P-CSI reporting), in which UE transmits channel state information (CSI) in subframes of a predetermined cycle is supported, only one CC's CSI can be transmitted per subframe in periodic CSI reporting of existing systems. For this reason, the periodic CSI reporting method of existing systems may be unsuitable to cases where the channel state information of many CCs needs to be reported, such as when the number of CCs is expanded to six or more.

One or more embodiments of the present invention provide a user terminal, a radio base station and a radio communication method that can implement adequate periodic CSI reporting when the number of component carriers (CCs) that can be configured in a user terminal is expanded more than in existing systems.

According to one aspect of the present invention, a user terminal has a transmission section that transmits uplink control information (UCI), and a control section that controls to transmit at least a part of the UCI by using a specific PUCCH format (PF: Physical Uplink Control Channel Format), wherein, when the UCI includes multiple periodic channel state information (P-CSI) and multiple HARQ-ACKs, the control section controls to transmit the UCI by using a resource designated by downlink control information and a PF of large capacity than PF3.

Advantageously, periodic CSI reporting carried out adequately even when the number of component carriers that can be configured in a user terminal is expanded more than in existing systems.

Figure 1:
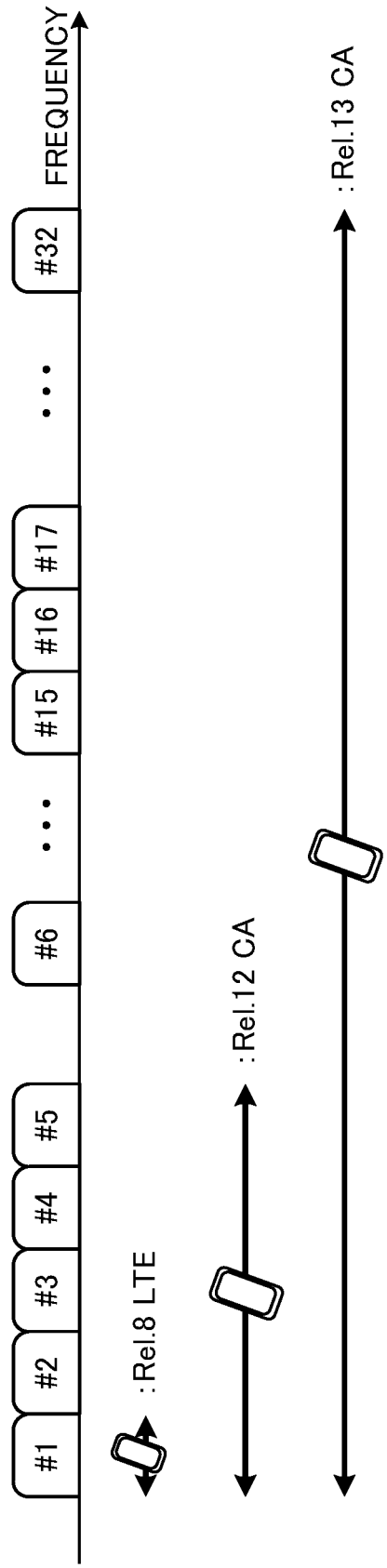
FIG. 1 is a diagram to explain carrier aggregation.

FIG. 1 is a diagram to explain carrier aggregation. As shown in FIG. 1, in CA of up to LTE Rel. 12, maximum five component carriers (CCs) (CC #1 to CC #5) are bundled, where the system band of LTE Rel. 8 constitutes one unit. That is, in CA up to LTE Rel. 12, the number of CCs that can be configured per UE is limited to a maximum of five.

On the other hand, in CA of LTE Rel. 13, a study is in progress to expand the bandwidth further by bundling six or more CCs. That is, in CA of LTE Rel. 13, expansion of the number of CCs (cells) that can be configured per UE to six or more (CA enhancement) is being studied. For example, as shown in FIG. 1, when 32 CCs (CC #1 to CC #32) are bundled, a bandwidth of maximum 640 MHz can be secured.

More flexible and faster radio communication is expected to be made possible by thus reducing the limit on the number of CCs that can be configured per UE. Also, expanding the number of CCs like this is an effective way to widen the band based on CA (LAA: License-Assisted Access) between licensed bands and unlicensed bands. For example, five licensed band CCs (=100 MHz) and fifteen unlicensed band CCs (=300 MHz) are bundled, and a bandwidth of 400 MHz can be secured.

By the way, in the existing system (LTE Rel. 8-12), uplink control information (UCI) is fed back from the UE to a device on the network side (for example, a radio base station (eNB: eNodeB)). The UE may transmit UCI on the uplink shared channel (PUSCH: Physical Uplink Shared Channel) at the timing when the uplink data transmission is scheduled. The radio base station performs data retransmission control and scheduling control on the UE based on the received UCI.

UCI in existing systems channel state information (CSI: Channel State Information), which includes at least one of channel quality indicator (CQI), precoding matrix indicator (PMI), precoding type indicator (PTI), and rank indicator (RI), and includes delivery acknowledgment information for downlink signals (for example, downlink shared channel (PDSCH: Physical Downlink Shared Channel)).

For example, in existing systems, periodic CSI reporting, in which the user terminal transmits channel state information (CSI) in subframes of a predetermined cycle, is supported. CSI transmitted in periodic CSI reporting may be referred to as "periodic CSI" or "P-CSI," and will be referred to as "P-CSI" below. Further, the delivery acknowledgment information may be referred to as "HARQ-ACK" (Hybrid Automatic Repeat reQuest Acknowledgment), "ACK/NACK "(A/N)," retransmission control information," is used to determine whether and the like.

To be more specific, UE receives (as configuration) the transmission subframe information for P-CSI from eNB by way of higher layer signaling (for example, RRC signaling). The transmission subframe information here refers to information that indicates the subframe to transmit P-CSI (hereinafter also referred to as a "transmission subframe"), and at least the cycle (interval) of this transmission subframe and the offset value of this transmission subframe with respect to the beginning of the radio frame are included. The UE transmits P-CSI in the transmission subframe of a predetermined cycle indicated by the transmission subframe information.

Feedback (UCI on PUCCH) using an uplink control channel (PUCCH: Physical Uplink Control Channel) and feedback (UCI on PUSCH) using an uplink shared channel (PUSCH: Physical Uplink Shared Channel) are defined as UCI feedback methods. For example, if there is uplink user data, the UE transmits P-CSI using the PUSCH. On the other hand, if there is no uplink user data, the UE transmits P-CSI using the PUCCH.

UCI on PUSCH is used when UCI transmission and PUSCH transmission overlap within one TTI (Transmission Time Interval) (for example, one subframe). In this case, UCI may be mapped to the PUCCH resource and simultaneous PUCCH-PUSCH transmission may be performed, or UCI may map to radio resources in the PUSCH region and only PUSCH transmission may be performed.

In existing systems, PUCCH formats 2, 2a, 2b and 3 are supported as P-CSI transmission formats using an uplink control channel. In these existing PFs, only P-CSI of one CC (cell) can be transmitted.

Therefore, when transmitting P-CSIs of a plurality of CCs (cells) using an existing PF, the UE transmits the P-CSIs of a plurality of CCs in different subframes (TDM (Time Division Multiplexing). P-CSIs of multiple CCs may be simply referred to as "multiple P-CSIs".

Also, when P-CSI transmissions pertaining to a plurality of CCs (cells) collide in the same subframe, the user terminal transmits one CC's P-CSI, which is selected according to a predetermined rule, and stops transmitting (drops) the rest of the CCs' P-CSI. For example, if transmission of P-CSIs of multiple cells conflict, the UE drops the P-CSIs other than the P-CSI of the cell having the smallest index (ServCellIndex) for identifying the serving cell, according to the priority rule prescribed in Rel. 12.

UCI including one CC's P-CSI and a one-bit or two-bit HARQ-ACK is supported by PF 2a/2b. In this case, the HARQ-ACK is used to modulate the demodulation reference signal (DMRS: DeModulation Reference Signal). To be more specific, the HARQ-ACK is used as DMRS scrambling seed. P-CSI is multiplexed to symbols other than DMRS.

Also, UCI including one CC's P-CSI and a multiple-bit HARQ-ACK is supported by PF 3. In this case, the bit sequences consisting of the HARQ-ACK and the P-CSI are joint-coded, and the encoded bit sequence is multiplexed on symbols other than the DMRS. When ARI (Ack/nack Resource Indicator) is available, PF 3 is used, and, if ARI is not available, PF 2a/2b is used (fallback).

However, when P-CSI for six or more CCs (cells) is transmitted in different subframes using an existing PUCCH format, it is expected that the P-CSI reporting cycle becomes longer than in existing systems in each CC. For example, if an attempt to transmit P-CSI for 32 CCs using an existing PF is made, the P-CSI reporting cycle in each CC will be 32 ms at the shortest.

Also, when a CC (PCell or PUCCH SCell) that transmits the PUCCH is a TDD (Time Division Duplexing) carrier, uplink subframes that can transmit the PUCCH are limited. For example, when using an uplink/downlink configuration (TDD UL/DL configuration) with a DL/UL ratio of 5:1, it is necessary to multiply the cycle by 5. Normally, on the side of the radio base station, it is desirable to acquire P-CSI from the user terminal in a timely manner, and therefore it is not desirable to increase the P-CSI reporting cycle of each CC.

Also, if P-CSI for six or more CCs (cells) is transmitted using an existing PUCCH format, this might lead to increased collisions of P-CSI among multiple CCs (cells) in the same subframe. In such a case, the amount of information that is stopped from being transmitted (that is, dropped) is likely to increase.

As described above, the existing periodic CSI reporting method to use existing PUCCH formats is more likely to be unsuitable to cases where P-CSI of a large number of CCs (cells) needs to be reported, such as when the number of CCs (cells) that can be configured per user terminal is expanded to six or more (for example, 32).

Here, when the number of CCs (cells) that can be configured per user terminal is expanded to six or more (for example, 32), it is necessary to make it possible to transmit delivery acknowledgment information (HARQ-ACKs) in response to downlink signals from six or more CCs. For this reason, in LTE Rel. 13, a new PUCCH format is being considered which can transmit delivery acknowledgment information of more CCs than existing PUCCH formats (for example, PF 1a/1b, 3, etc.) (that is, format that can transmit a larger number of bits).

The new PUCCH format is expected to have larger capacity than existing PUCCH formats 2, 2a, 2b and 3 that can transmit one CC's P-CSI. The new PUCCH format may be referred to as "new PF," "enhanced PF," "Rel. 13 PF," "PF 4," and so on. For example, while PF 3 can transmit up to 10 bits when FDD is used (Frequency Division Duplexing) and transmit up to 21 bits when TDD is used, a new PF may be comprised of radio resources capable of transmitting 64 to 256 bits (for example, radio resources capable of transmitting 128 bits).

Figure 2B:
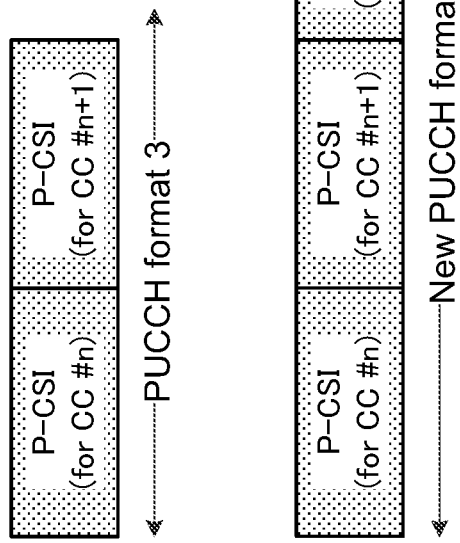
FIG. 2A and FIG. 2B are diagrams to show an example of information included in UCI when transmitting a plurality of P-CSIs in PF 3 and a new PF in accordance with embodiments of the invention.
Figure 2A:
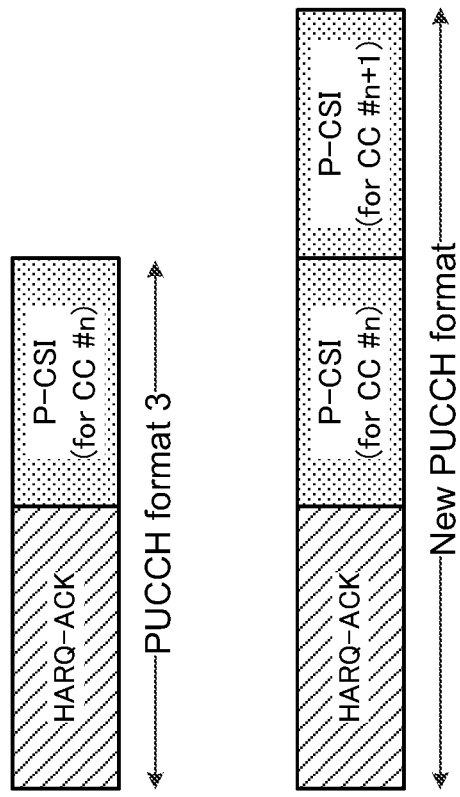

A study is in progress to transmit UCI including a plurality of P-CSIs in one subframe by using existing PF and new PF. FIG. 2 is a diagram to show an example of information included in UCI when multiple P-CSIs are transmitted in PF 3 and a new PF. In FIG. 2A, UCI including HARQ-ACK and P-CSI is shown, and, in FIG. 2B, UCI including only P-CSI is shown.

For example, when PF 3 is used, as in existing configurations, it may be possible to include HARQ-ACK bit sequence and one P-CSI bit sequence (FIG. 2A), or unlike existing configurations, it may be possible to include multiple (for example, two) P-CSI bit sequences (FIG. 2B). Also, in the case where a new PF is used, it is possible to include a bit sequence of HARQ-ACK and a plurality (for example, two) of P-CSI bit sequences (FIG. 2A), or it may be possible to include multiple (for example, 3) P-CSI bit sequences (FIG. 2B).

However, the method of selecting PFs, radio resources, coding methods, etc. to use for UCI including multiple P-CSIs is not particularly studied. Consequently, inconsistencies may arise between the UE and the eNB regarding how to use the uplink channel.

Therefore, the inventors of the present invention have proposed a method in which the UE and the eNB can appropriately transmit and receive a plurality of CSIs when UCI including a plurality of CSIs is transmitted in a periodic subframe (reporting subframe). Then, the inventors of the present invention have come up with an idea to control (select) radio resources for allocate UCI including a plurality of CSIs based on a predetermined condition (for example, whether or not simultaneous transmission of an uplink control channel and an uplink shared channel is configured). With this, for example, P-CSIs of multiple CCs and HARQ-ACKs of multiple CCs can be multiplexed on the same PUCCH and fed back appropriately.

To be more specific, according to one example of the present invention, UE and eNB can appropriately select PUCCH and/or PUSCH resources for transmitting a plurality of CSIs, coding for UCI, the P-CSIs to be dropped, and the like. With this, for example, P-CSIs of multiple CCs and HARQ-ACKs of multiple CCs can be multiplexed on the same PUCCH and fed back appropriately.

Now, embodiments of the present invention will be described below. Now, although example cases will be described with the following embodiments in which CA to use maximum 32 CCs is configured in user terminals, the application of the present invention is by no means limited to this. For example, the methods to be described with the embodiments can be used even when CA to use five or fewer CCs is configured.

Further, in the following embodiments, a case where a PUCCH is transmitted for each cell group (CG: Cell Group) composed of one or more CCs will be explained. The concerned CG may be called, for example, PUCCH CG or PUCCH group. The present invention is also applicable to CA that does not use PUCCH CG.

(Radio Communication Method)

In the radio communication method in one example of the present invention, the UE transmits at least some of the multiple P-CSIs and HARQ-ACKs using a specific PF, based on whether or not simultaneous transmission of an uplink control channel and an uplink shared channel is configured (permitted) and the number of HARQ-ACKs scheduled to be transmitted simultaneously (in the same TTI) with multiple P-CSIs.

Below, resources for mapping UCI, encoding for UCI, rules for dropping P-CSI, etc. after the UE determines whether or not simultaneous transmission of an uplink control channel and an uplink shared channel is permitted will be described in detail (first and second embodiments).

For example, a parameter (simultaneous PUCCH-PUSCH) indicating whether simultaneous PUCCH-PUSCH transmission is configured in a cell where the PUCCH is configured (for example, PCell, PSCell, etc.) may be reported from the eNB to the UE by RRC signaling. The UE can determine whether simultaneous PUCCH-PUSCH transmission on a predetermined PUCCH CG is possible or not based on the parameter.

First Embodiment: Simultaneous PUCCH-PUSCH Transmission not Configured

In accordance with embodiments of the invention, a first aspect will now be described. The first embodiment relates to the CSI feedback method used in PUCCH CG when simultaneous PUCCH-PUSCH transmission is not configured (permitted).

Embodiment 1.1

In accordance with embodiments of the invention, an aspect of the invention will now be described. Embodiment 1.1 relates to a CSI feedback method used when UCI includes multiple P-CSIs and does not include HARQ-ACKs and PF 3 or new PF is configured for multiple P-CSIs.

Figure 3:
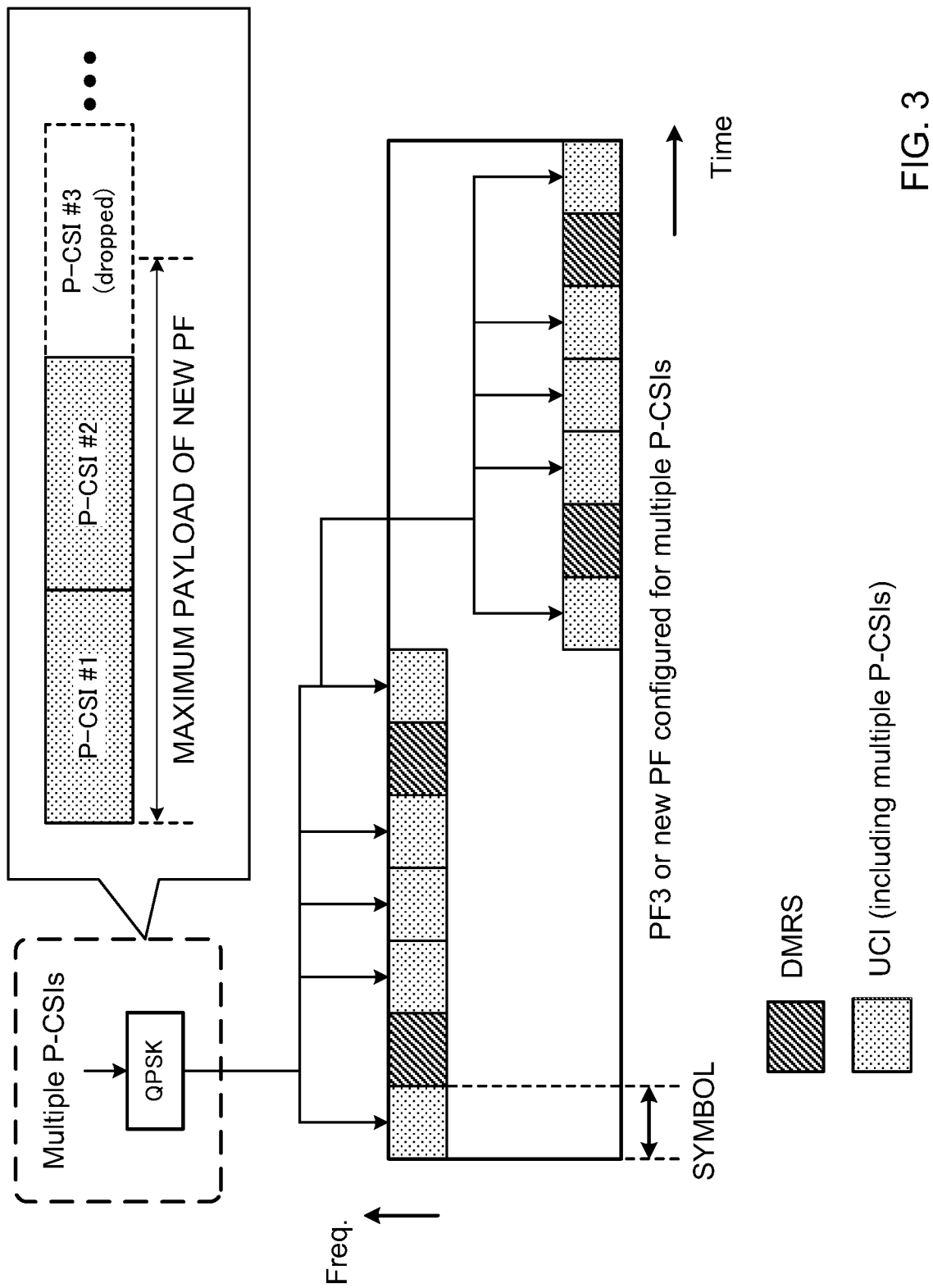
FIG. 3 is a diagram showing an example of modulation and resource mapping of PF 3 or new PFs configured for multiple P-CSIs in embodiment 1.1.

In Embodiment 1.1, multiple P-CSIs are sent in PF 3 or new PF. Radio resources used in PF 3 or new PF where multiple P-CSIs are assigned are configured by higher layer signaling (for example, RRC signaling). FIG. 3 is a diagram showing an example of modulation and resource mapping of PF 3 or new PF configured for multiple P-CSIs in the embodiment 1.1. In FIG. 3, the assignment of PFs in one subframe is shown.

First, when recognizing that a plurality of P-CSIs are transmitted in a predetermined subframe, the UE determines PFs used for transmitting a plurality of P-CSIs. PFs used for transmitting a plurality of P-CSIs in the relevant subframe may be determined by the UE according to the number of P-CSIs, the number of bits, etc., or may be configured in the UE from the eNB through higher layer signaling.

When the total size (the number of bits) of a plurality of P-CSIs is smaller than the maximum payload size of the determined PF, or when the total size (the number of bits) after encoding a plurality of P-CSIs with respect to the determined maximum payload size of PF is smaller than a predetermined value, all P-CSIs are included in UCI (that is, the P-CSIs are transmitted in the selected PF). On the other hand, if the total size of multiple P-CSIs is larger than the maximum payload size of the determined PF, or if the total size (the number of bits) after encoding a plurality of P-CSIs with respect to the determined maximum payload size of PF is larger than a predetermined value, the P-CSIs to include in the UCI are determined according to a predetermined rule.

For example, as the predetermined rule, the above-described priority rule defined in LTE Rel. 10-12 may be used. In FIG. 3, P-CSI #1 and #2 are included in UCI because they have higher priority than P-CSI #3 and other P-CSIs. P-CSI #3 and other P-CSI are dropped. The predetermined rule is not limited to this.

Next, the UE applies encoding and modulation to a plurality of P-CSI bit sequences constituting the UCI to obtain modulation symbols (for example, SC-FDMA (Single-Carrier Frequency Division Multiple Access) symbols). In FIG. 3, although QPSK modulation is used (Quadrature Phase-Shift Keying), this is not limiting, and, for example, in the case of using a new PF, m-ary modulation above 16 QAM (Quadrature Amplitude Modulation) or the like may be used.

When PF 3 is configured as a PF for multiple P-CSIs, as shown in FIG. 3, the UE assigns UCIs to symbols #0, #2, #3, #4 and #6 of each slot, and the UE assigns DMRSs to symbols #1 and #5. In PF 3, the same bit sequence is copied to five or four symbols (in abbreviated format) excluding DMRS symbols and multiplied by orthogonal codes (OCC: Orthogonal Cover Code). The PUCCH of each UE can be code-division-multiplexed (CDM) by multiplying using different OCCs for each UE.

In the new PF, a study is in progress to arrange one or two DMRS symbols in each slot. When two DMRS symbols are included, the DMRS symbols may be mapped to the same position as the DMRS symbols position in PF 3, and, when one DMRS symbol is included, the DMRS symbol may be mapped to the central symbol (symbol #3) of each slot, like the position in PF 2/2a/2b or PUSCH. The number of DMRS symbols and the mapping positions in the new PF are not limited to these.

In addition, the new PF may support configuring the orthogonal code length (spreading factor) to 1 (that is, CDM is not applied). In this case, since it is possible to map different bit sequences to each symbol (data symbol) other than DMRS symbols, the payload per PUCCH can be increased (the maximum number of bits that can be transmitted). Note that the new PF may support an orthogonal code length (spreading factor) other than 1.

Also, in the new PF, resource elements (REs) may be mapped, for example, in frequency-to-time order (freq.-to-time order) or in time-to-frequency order (time-to-freq. order).

When freq.-to-time-order mapping is used, in a modulation symbols, in symbol #0 of the first slot, for example, data is allocated in the frequency direction in the order of subcarriers #0, #1, . . . #11, and, when the symbol is filled, mapping is performed in the frequency direction in the next symbol (symbol #1), and mapping is performed similarly in the next and subsequent symbols.

On the other hand, if time-to-freq.-order mapping is used, in a modulation symbol, data is allocated following the direction of time in the order of symbols #0, #2, #3, . . . #6 in the first slot and symbols #0, #2, #3, . . . #6 in the second slot with respect to a predetermined subcarrier (for example, subcarrier #0), and, when this subcarrier is filled, mapping is performed in the time direction on the next subcarrier (for example, subcarrier #1), and mapping is similarly performed on the next and subsequent subcarriers.

Furthermore, although, in FIG. 4, the PRB to transmit the PUCCH is changed between slots (that is, inter-slot frequency hopping is applied), the new PUCCH format of FIG. 4 may be configured not to use frequency hopping, or frequency hopping may be configured by higher layer signaling.

As described above, according to the embodiment 1.1, a plurality of P-CSIs can be multiplexed on one PUCCH and properly reported. By applying joint coding to multiple P-CSIs (by coding a plurality of P-CSIs as one information bit sequence and performing encoding), it becomes unnecessary to add CRC (Cyclic Redundancy Check) and parity bits for each P-CSI, so that overhead can be reduced.

Embodiment 1.2

In accordance with embodiments of the invention, an aspect of the invention will now be described. Embodiment 1.2 relates to a CSI feedback method used when UCI includes multiple P-CSIs and one-bit or two-bit HARQ-ACKs and PF 3 or new PF is configured for multiple P-CSIs.

In Embodiment 1.2, multiple P-CSIs and one-bit or two-bit HARQ-ACKs are sent in PF 3 or new PF using resources configured by RRC signaling. FIG. 4 is a diagram showing an example of modulation and resource mapping of PF 3 or new PF that is configured for multiple P-CSIs in the embodiment 1.2. In FIG. 4, assignment of PF in one subframe is shown like FIG. 3. In this example, BPSK (Binary Phase-Shift Keying) modulation or QPSK modulation is applied to HARQ-ACKs, but this is not limiting.

FIG. 4A shows an example in which a plurality of P-CSI bit sequences and HARQ-ACK bits are separately encoded. In the case of FIG. 4A, a plurality of P-CSIs are mapped to data symbols of PF 3 or new PF, and, on the other hand, the HARQ-ACK is used for scrambling as a predetermined DMRS modulation symbol. That is, the UE may scramble the DMRSs in a specific PF (PF 3 or new PF) based on delivery acknowledgment information (HARQ-ACK) of one bit or two bits. In this case, the eNB can identify the HARQ-ACK bits based on the detection result of DMRSs.

In FIG. 4A, the predetermined DMRS is the second DMRS symbol (symbol #5) in each slot, but this is not limiting, and the first DMRS symbol (symbol #1) in each slot may be used, or DMRS symbols at different positions may be used in each slot, for example. Also, when new PF is formed with one DMRS per slot, the DMRS symbols of both slots may be scrambled by HARQ-ACK.

FIG. 4B shows a case where a plurality of P-CSI bit sequences and HARQ-ACK bits are coded together (joint coding). As shown in FIG. 4B, it is preferable that a plurality of P-CSI bit sequences are appended after the HARQ-ACK bit and jointly coded with HARQ-ACK and included in the PF. In this case, a configuration is used to reserve the first one bit or two bits of the UCI for HARQ-ACK. Multiple P-CSIs and HARQ-ACKs are mapped to data symbols.

Figure 5A:
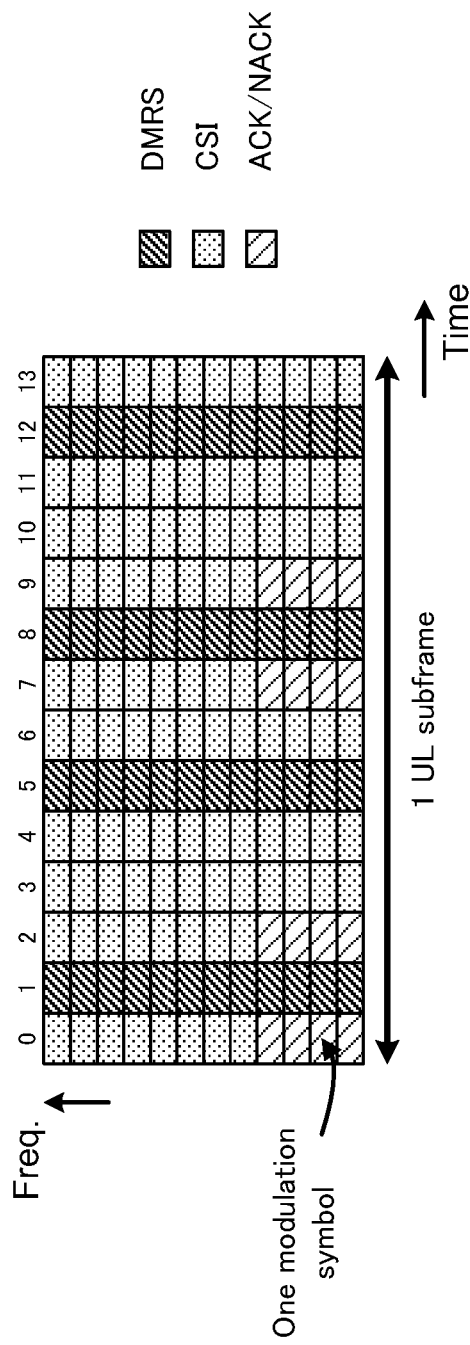
FIGS. 5A and 5B illustrate another example of modulation and resource mapping of PF 3 or new PFs configured for multiple P-CSIs in embodiment 1.2.

FIG. 5 is a diagram showing another example of modulation and resource mapping of PF 3 or new PF that is configured for multiple P-CSIs in embodiment 1.2. FIG. 5 shows uplink radio resources of 1 PRB (Physical Resource Block) pair (14 symbols×12 subcarriers) are shown in the case of assigning normal cyclic prefix to each symbol. FIG. 5 shows the mapping image of radio resources before DFT (Discrete Fourier Transform) is applied, and the symbols actually transmitted are arranged interleaved in the frequency direction. One modulation symbol is allocated to each RE.

FIG. 5 shows a case where the PF is composed of two DMRS symbols/slot, and, in FIG. 5, the fact that a plurality of P-CSI bit sequences and HARQ-ACK bits are separately coded is the same as the example of FIG. 4, but the mapping method is different.

In FIG. 5, the UE first maps CSI (for example, CQI) to data symbols. CSI may be mapped in frequency-to-time-order or time-to-frequency-order. Thereafter, the UE maps one-bit or two-bit HARQ-ACKs. At this time, if the CSI is already mapped to the resource to which the HARQ-ACK is mapped, the UE punctures the CSI and maps the HARQ-ACK.

Figure 5B:
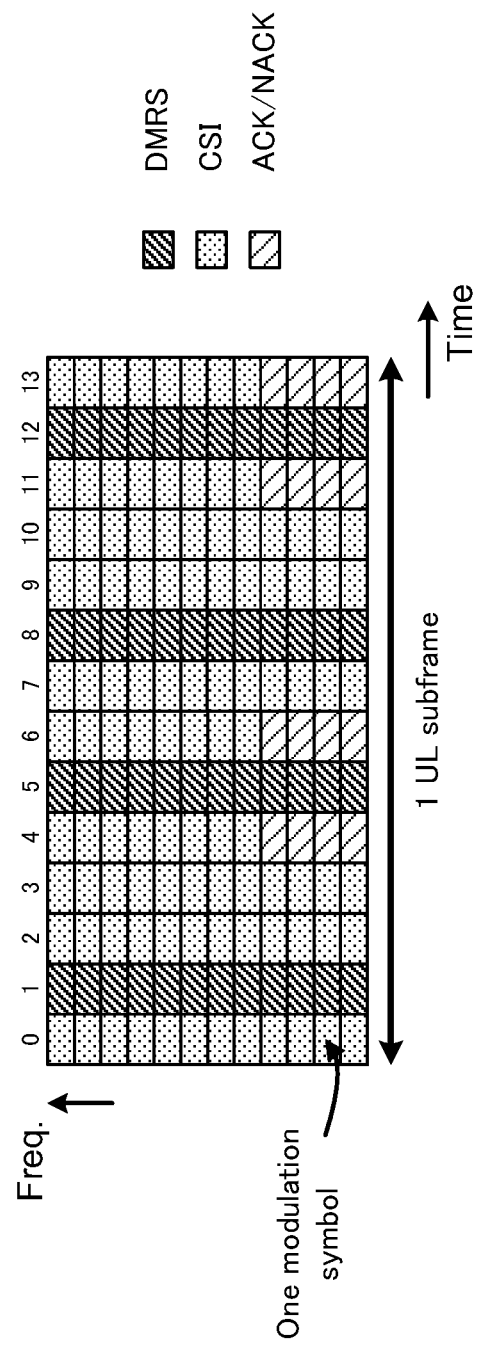

More to be more specific, one-bit or two-bit HARQ-ACKs are mapped to resources close to DMRSs (for example, temporally adjacent resources) so as to override the resources mapped to CSI. The HARQ-ACK may be placed in the resource adjacent to the first DMRS symbol of each slot (FIG. 5A), or the HARQ-ACK may be placed in a resource adjacent to the second DMRS symbol of each slot (FIG. 5B). Note that the resource to which the HARQ-ACK is mapped is not limited to the position of FIG.

Figure 6:
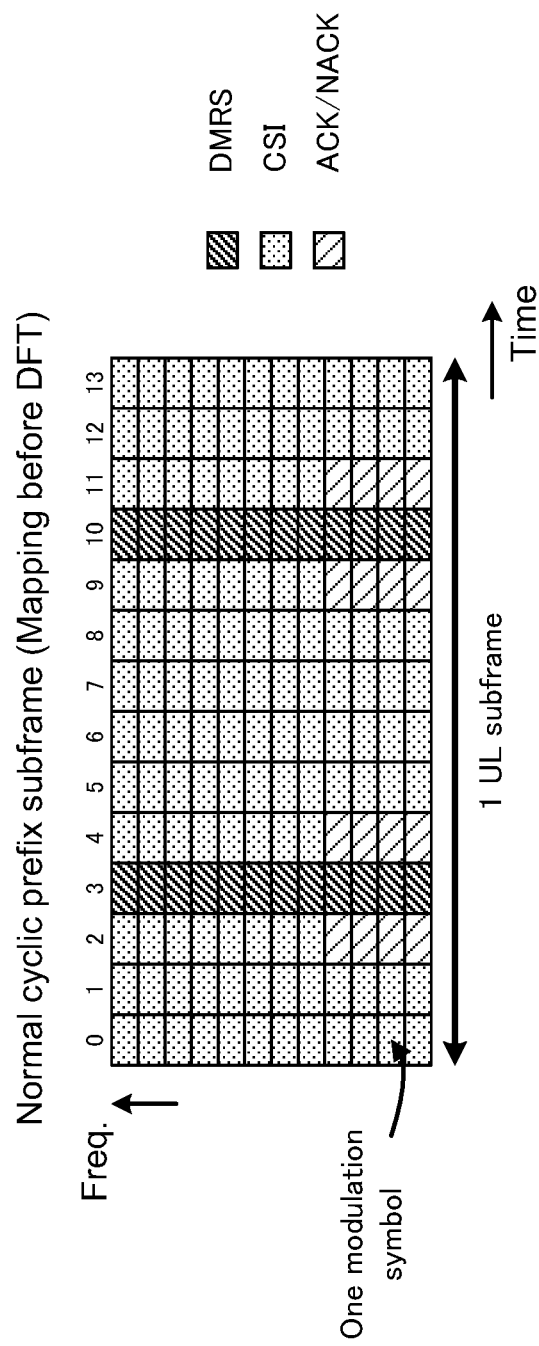
FIG. 6 is a diagram showing still another example of modulation and resource mapping of PF 3 or new PFs configured for multiple P-CSIs in embodiment 1.2.

FIG. 6 is a diagram showing yet another example of modulation and resource mapping of new PFs configured for multiple P-CSIs in the embodiment 1.2. FIG. 6, like FIG. 5, shows the mapping image of radio resources before application of DFT, and a new PF for multiple P-CSIs, formed with a DMRS symbol per slot, is shown. In this way, the HARQ-ACK of the new PF may be punctured near the DMRS symbols of both slots.

As described above, according to the embodiment 1.2, HARQ-ACK with a small number of bits and P-CSI with many bits can be appropriately multiplexed on the same PUCCH. When multiplexing is performed as shown in FIG. 4A, DMRS correlation detection is performed on all candidate HARQ-ACK bit patterns, so that HARQ-ACK bits can be detected with higher accuracy than P-CSIs. When multiplexing is performed as shown in FIG. 4B, different UCIs are treated as one bit codeword sequence, so that processing in the transmission encoder and the receiving decoder can be simplified.

Also, when multiplexing is performed as shown in FIG. 5 and FIG. 6, the amount of P-CSI resources and the amount of HARQ-ACK resources (that is, the coding rates of both) are appropriately controlled, so that it becomes possible to appropriately secure the required qualities of both of them, and, furthermore, the HARQ-ACK bits are mapped to different slots so that, when inter-slot frequency hopping is performed, a frequency diversity effect can be obtained. In addition, HARQ-ACK is overridden by P-CSI, so that, regardless of whether the UE includes HARQ-ACK in the PUCCH, the base station can decode the P-CSI.

In FIG. 6, since the position and the number of DMRS are the same as those of PUSCH, resource mapping rules in the case of using UCI on PUSCH (that is, when there is HARQ-ACK transmission in a subframe scheduled for PUSCH transmission and the HARQ-ACK is transmitted in the PUSCH) can be diverted, it is possible to reduce the size of the terminal circuit. When multiple DMRSs exist in each slot as shown in FIG. 5, even if there are multiple DMRSs in the same slot, the HARQ-ACK bits are mapped to adjacent symbols of one DMRS, so that the HARQ-ACK resource mapping rule in the case of using UCI on PUSCH can be applied as it is.

Note that the encoding, modulation and/or mapping methods shown in the embodiments 1.1 and 1.2 may be used in the same manner in each of the embodiments described below.

Embodiment 1.3

In accordance with embodiments of the invention, an aspect of the invention will now be described. Embodiment 1.3 concerns a CSI feedback method to use when UCI contains multiple P-CSIs and multiple HARQ-ACKs, PF 3 is configured for multiple P-CSIs, and PF 3 is configured for multiple HARQ-ACKs.

FIG. 7 is a diagram for explaining the resources used to transmit a plurality of P-CSIs and multiple HARQ-ACKs in the embodiment 1.3. In FIG. 7, 4 CCs' P-CSIs and 4 CCs' HARQ-ACKs are shown as examples of UCI to be transmitted. The number of CCs to report UCI is not limited to this. For example, a plurality of HARQ-ACKs may be two bits, three bits or more.

Figure 7A:
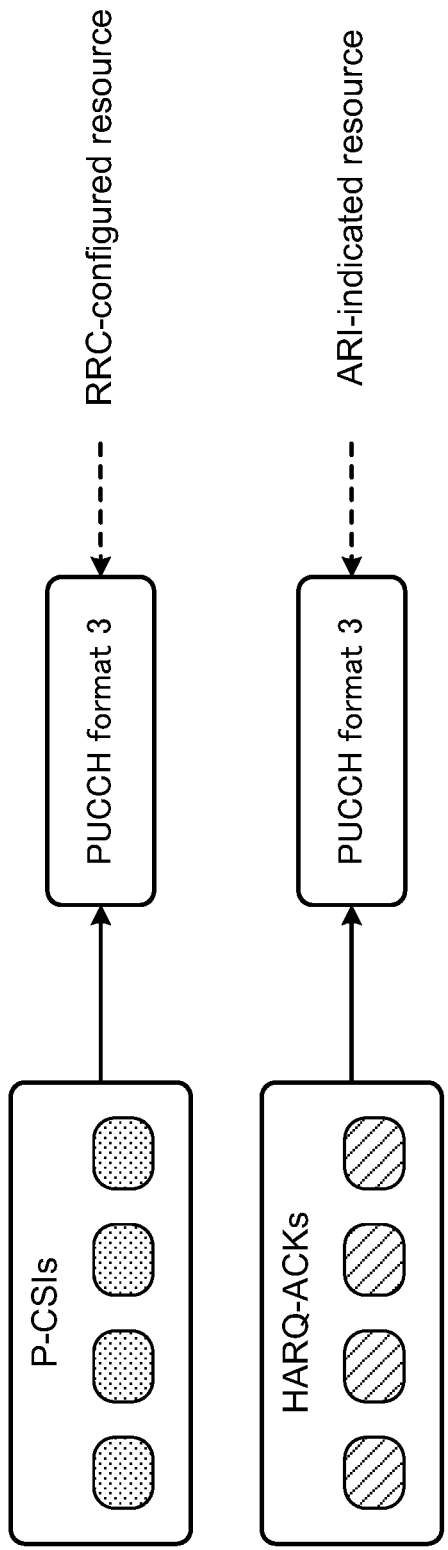
FIGS. 7A and 7B illustrate the resources used to transmit multiple P-CSIs and multiple HARQ-ACKs in the embodiment 1.3.

As shown in FIG. 7A, in embodiment 1.3, when only multiple P-CSIs are transmitted, transmission is performed in PF 3 using radio resources configured by RRC signaling. Also, if only multiple HARQ-ACKs are sent, transmission is performed in PF 3 using radio resources specified by physical layer signaling (ARI included in downlink control information (DCI)).

Hereinafter, the resources used when transmitting only a plurality of P-CSIs are also referred to as "resources for multiple P-CSIs," "resources for P-CSI," and the like. Also, resources used when only a plurality of HARQ-ACKs are transmitted are also referred to as "resources for multiple HARQ-ACKs," "resources for HARQ-ACKs" and the like.

Figure 7B:
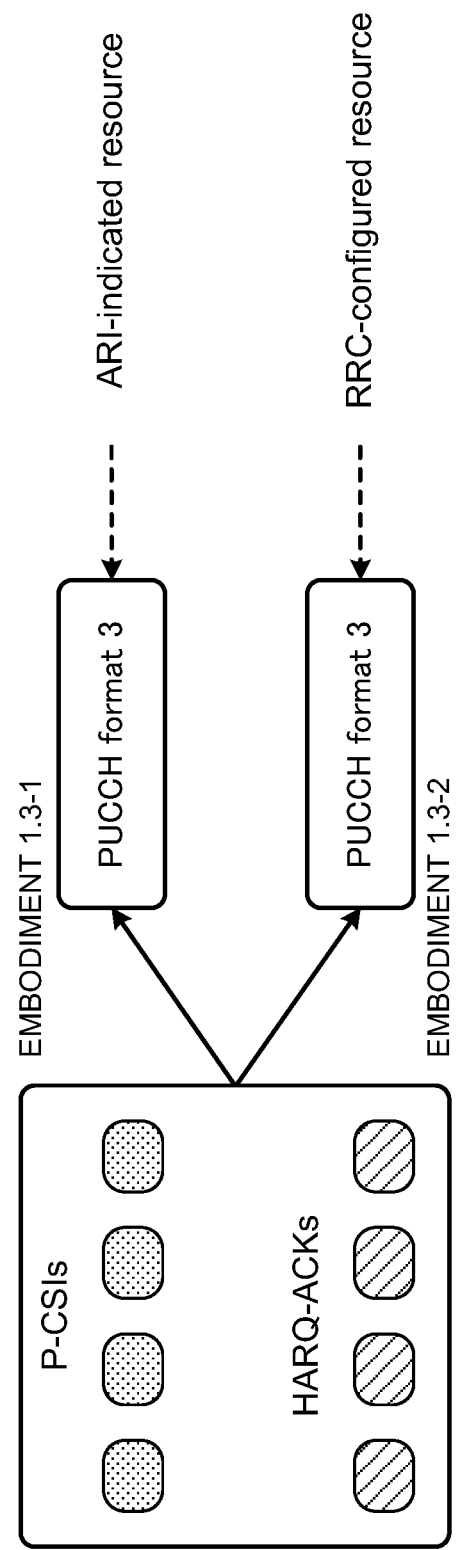

As shown in FIG. 7B, in embodiment 1.3, when a plurality of P-CSIs and a plurality of HARQ-ACKs are included in UCI, the UCI may be transmitted using PF 3 in resources for HARQ-ACK designated by ARI (embodiment 1.3-1), or the UCI may be sent using PF 3 in resources for P-CSI configured by RRC signaling (embodiment 1.3-2). In either case, in PF 3, at most one P-CSI and multiple HARQ-ACKs are sent.

The bit sequence of P-CSI may be jointly encoded following the HARQ-ACK bit sequence and included in the PF data symbol. Also, at most one P-CSI may be determined based on predetermined rules, and, for example, the P-CSI having the highest priority may be selected as the P-CSI as in the priority rule defined in LTE Rel. 10-12. Other P-CSIs not included in the PUCCH will be dropped (P-CSIs with relatively low priority).

The UE preferably applies a scrambling sequence associated with the information included in the UCI transmitted in PF 3 to the DMRS of PF 3 in the resource configured by the RRC (information indicating whether or not HARQ-ACKs are included in the UCI to be transmitted). That is, depending on whether UCI includes a plurality of P-CSIs and a plurality of HARQ-ACKs or only a plurality of P-CSIs, different scrambling is applied to the DMRS. PF 3 is originally a resource for transmitting only a plurality of P-CSIs, but the eNB can judge whether or not UCI includes HARQ-ACK bits based on the detection result of the DMRS.

Figure 8A:
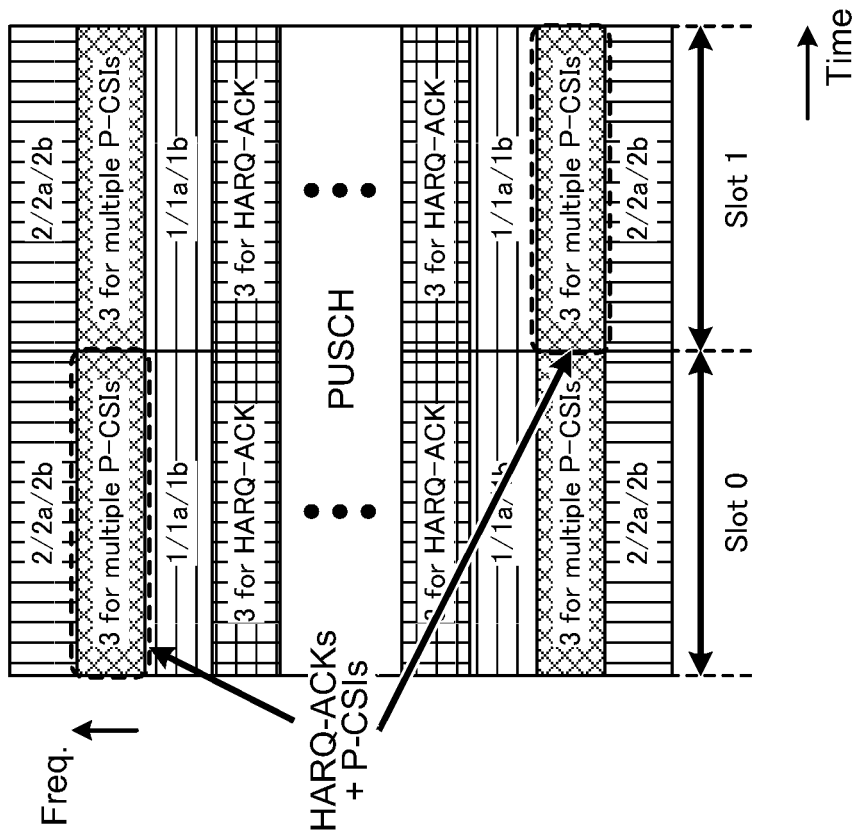
FIGS. 8A and 8B are diagrams illustrating examples of resources used to transmit multiple P-CSIs and multiple HARQ-ACKs in embodiment 1.3.
Figure 8B:
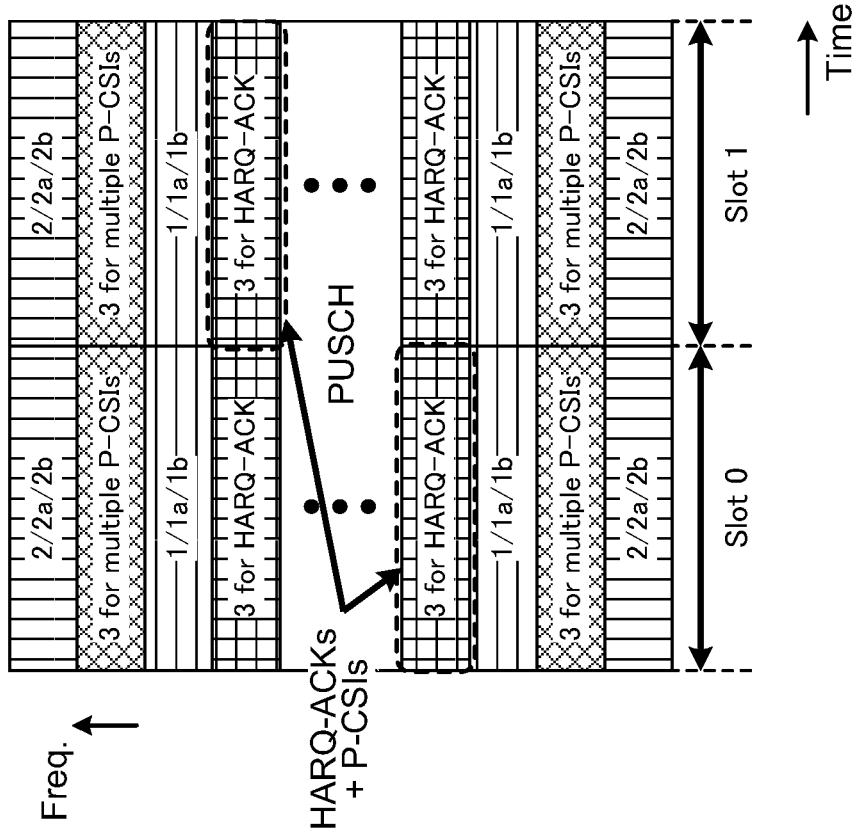

FIG. 8 is a diagram showing an example of a resource used for transmitting a plurality of P-CSIs and a plurality of HARQ-ACKs in the embodiment 1.3. FIG. 8 schematically shows resources to which each PUCCH format can be allocated in a predetermined subframe. FIG. 8A shows an example in which a plurality of P-CSIs and a plurality of HARQ-ACKs are transmitted using resources designated by ARI (Embodiment 1.3-1). FIG. 8B shows an example in which multiple P-CSIs and multiple HARQ-ACKs are transmitted using resources configured by RRC (Embodiment 1.3-2). Note that the PF resource allocation and mapping method is not limited to the configuration in FIG. 8.

According to the embodiment 1.3 above, information on whether or not an HARQ-ACK is included in UCI that is transmitted, can be matched between the base station and the terminal. In the case of embodiment 1.3-1, if an HARQ-ACK is included, resources specified by ARI are used, so that the base station can determine whether an HARQ-ACK is included in the received PUCCH depending on in which PUCCH resource UCI is received. In the case of embodiment 1.3-2, although the PUCCH resource does not change if HARQ-ACK is included or not, but the DMRS scrambling sequence changes, so that the base station can determine whether or not HARQ-ACK is included in the received PUCCH based on how the DMRS is scrambled.

Embodiment 1.4

In accordance with embodiments of the invention, an aspect of the invention will now be described. Embodiment 1.4 concerns a CSI feedback method for use when UCI includes multiple P-CSIs and multiple HARQ-ACKs, PF 3 is configured for multiple P-CSIs, and a new PF is configured for multiple HARQ-ACKs.

FIG. 9 is a diagram illustrating the resources used to transmit multiple P-CSIs and multiple HARQ-ACKs in embodiment 1.4. As shown in FIG. 9A, in the embodiment 1.4, when only a plurality of P-CSIs are transmitted, transmission is performed in PF 3 using radio resources configured by RRC signaling. Also, if only multiple HARQ-ACKs are sent, transmission is performed in a new PF using radio resources specified by physical layer signaling (ARI included in DCI).

In embodiment 1.4, when a plurality of P-CSIs and multiple HARQ-ACKs are included in UCI, as shown in FIG. 9B, a plurality of P-CSIs and a plurality of HARQ-ACKs are transmitted using a new PF in the HARQ-ACK resource specified by ARI.

As described above, according to the embodiment 1.4, it is possible to match information on whether an HARQ-ACK is included in UCI that is transmitted, between the base station and the terminal. UCI without HARQ-ACK is sent using resources configured by RRC and UCI including HARQ-ACK is transmitted using resources specified by ARI, so that the base station can determine whether an HARQ-ACK is included in the received PUCCH depending on in which PUCCH resource UCI is received.

Embodiment 1.5

In accordance with embodiments of the invention, an aspect of the invention will now be described. Embodiment 1.5 concerns a CSI feedback method for use when UCI contains multiple P-CSIs and multiple HARQ-ACKs, a new PF is configured for multiple P-CSIs, and PF 3 is configured for multiple HARQ-ACKs.

Figure 10A:
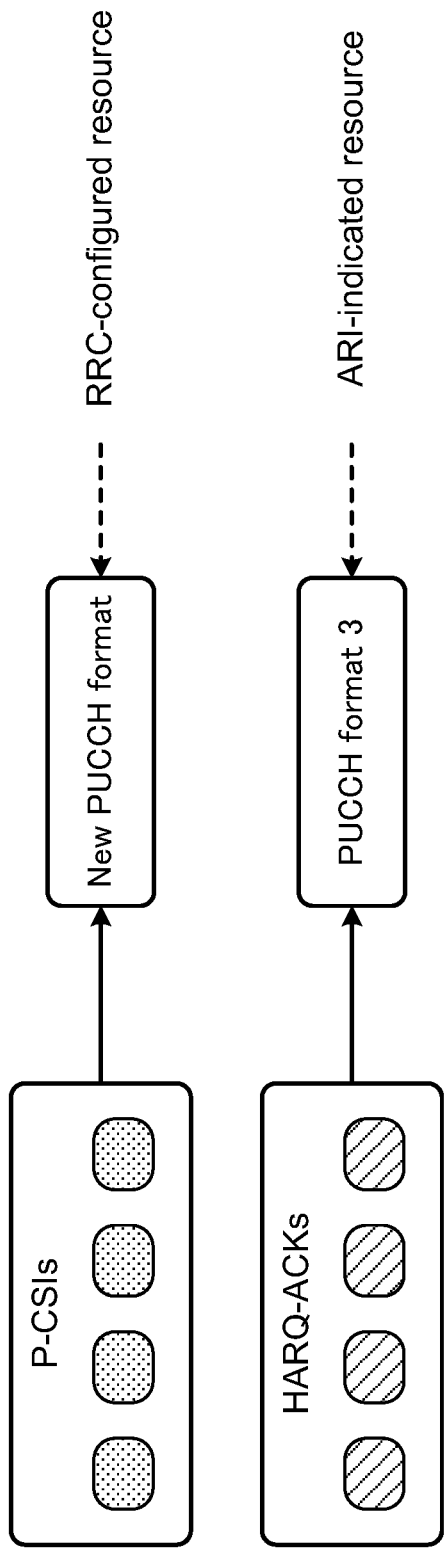
FIGS. 10A and 10B are diagrams illustrating the resources used to transmit multiple P-CSIs and multiple HARQ-ACKs in embodiment 1.5.

FIG. 10 is a diagram illustrating the resources used to transmit multiple P-CSIs and multiple HARQ-ACKs in embodiment 1.5. As shown in FIG. 10A, in embodiment 1.5, if only a plurality of P-CSIs are transmitted, transmission is performed in a new PF using radio resources configured by the RRC signaling. In addition, when only multiple HARQ-ACKs are transmitted, transmission is performed in PF 3 using radio resources specified by physical layer signaling (ARI included in DCI).

Figure 10B:
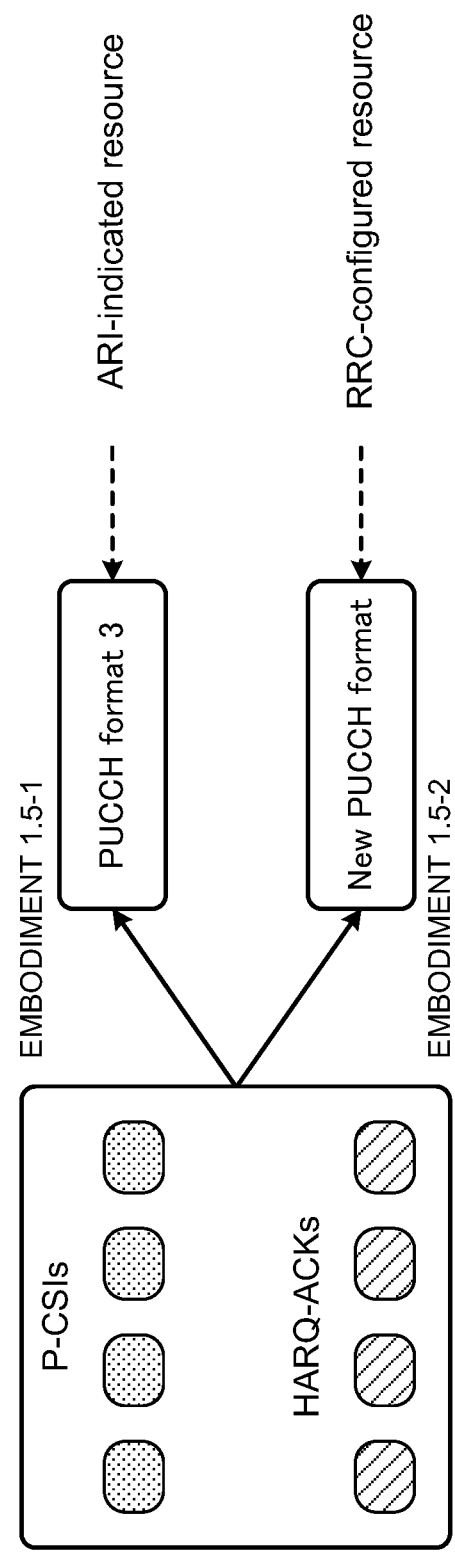

As shown in FIG. 10B, in embodiment 1.5, if UCI contains multiple P-CSIs and multiple HARQ-ACKs, as in embodiment 1.3-1, UCI may be transmitted using PF 3 in resource for HARQ-ACK specified by ARI (embodiment 1.5-1). In this case, at most one P-CSI and multiple HARQ-ACKs are sent in PF 3.

Also, in embodiment 1.5, multiple P-CSIs and multiple HARQ-ACKs may be transmitted using a new PF in P-CSI resources configured by RRC signaling (embodiment 1.5-2).

Note that the UE preferably applies scramble associated with information (information as to whether an HARQ-ACK is included in UCI that is transmitted) included in the UCI transmitted in the new PF to CRC or DMRS of the new PF in the resource configured by RRC. That is, different scrambling is applied to the CRC or DMRS depending on whether UCI includes a plurality of P-CSIs and multiple HARQ-ACKs or only a plurality of P-CSIs. The new PF is originally assumed to transmit only a plurality of P-CSIs, but the eNB can judge whether or not UCI received in the new PF contains HARQ-ACK bits based on the decoding result of CRC or the detection result of DMRS.

As described above, according to embodiment 1.5, it is possible to match the information on whether an HARQ-ACK is included in UCI that is transmitted, between the base station and the terminal. In the case of embodiment 1.5-1, when an HARQ-ACK is included in UCI, resources specified by ARI are used, so that the base station can determine whether an HARQ-ACK is included in the received PUCCH depending on in which PUCCH resource UCI is received. In the case of embodiment 1.5-2, the PUCCH resource does not change whether or not an HARQ-ACK is included, but the DMRS or CRC scrambling sequence changes, so that the base station can determine whether an HARQ-ACK is included in the received PUCCH depending on how the DMRS or the CRC is scrambled.

Embodiment 1.6

In accordance with embodiments of the invention, an aspect of the invention will now be described. Embodiment 1.6 concerns a CSI feedback method for use when UCI includes multiple P-CSIs and multiple HARQ-ACKs, a new PF is configured for multiple P-CSIs, and a new PF is configured for multiple HARQ-ACKs.

Figure 11A:
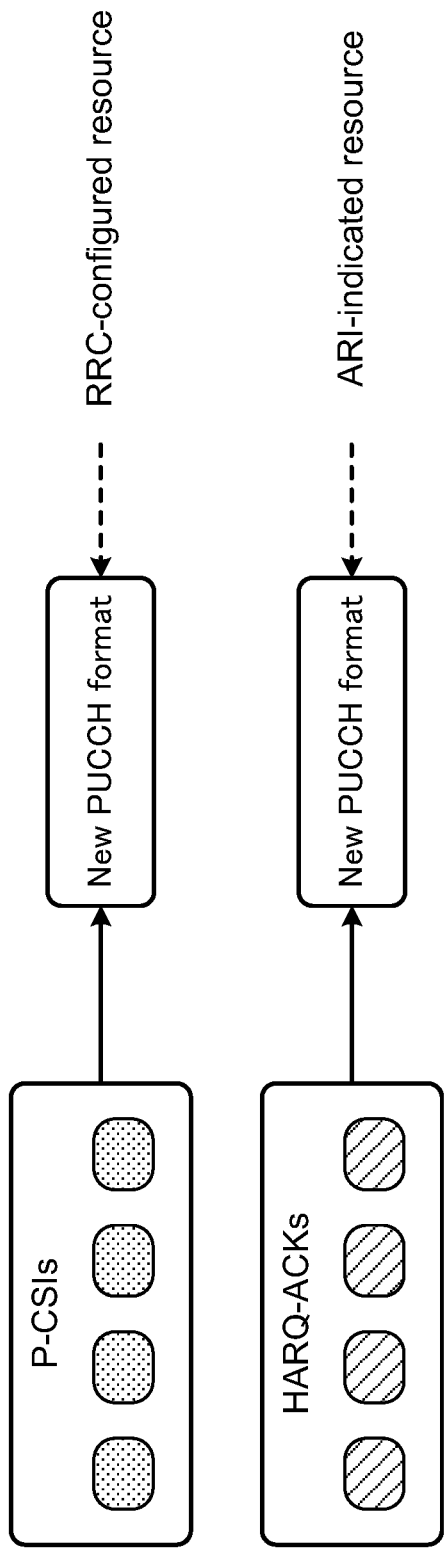
FIGS. 11A and 11B illustrate the resources used to transmit multiple P-CSIs and multiple HARQ-ACKs in embodiment 1.6.

FIG. 11 is a diagram illustrating the resources used to transmit multiple P-CSIs and multiple HARQ-ACKs in embodiment 1.6. As shown in FIG. 11A, in embodiment 1.6, when only multiple P-CSIs are transmitted, transmission is performed in a new PF using radio resources configured by RRC signaling. Also, when only a plurality of HARQ-ACKs are transmitted, transmission is performed in a new PF using radio resources specified by physical layer signaling (ARI included in DCI).

Figure 11B:
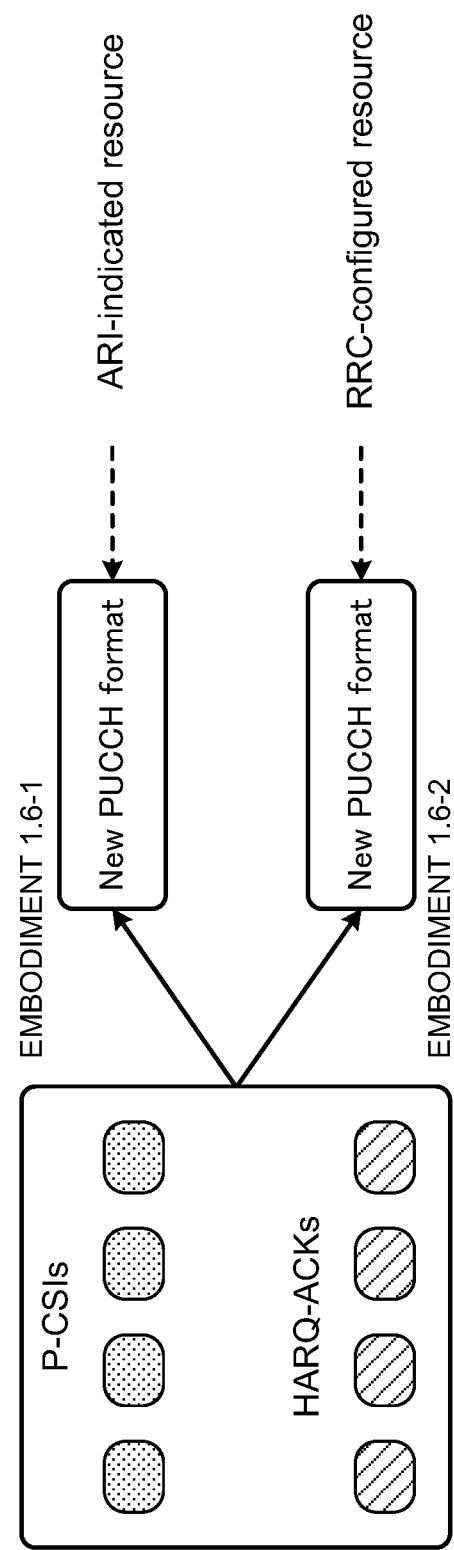

As shown in FIG. 11B, in embodiment 1.6, when a plurality of P-CSIs and multiple HARQ-ACKs are included in UCI, UCI may be transmitted using a new PF in resources for HARQ-ACKs specified by ARI (embodiment 1.6-1). In this case, multiple P-CSIs and multiple HARQ-ACKs are sent in the new PF. Note that the P-CSI bit sequence is preferably included in the PF data symbol following the HARQ-ACK bit sequence.

Also in embodiment 1.6, like embodiment 1.5-2, multiple P-CSIs and multiple HARQ-ACKs may be transmitted using a new PF in P-CSI resources configured by RRC signaling (embodiment 1.6-2). The scrambling sequence used in the new PF is the same as in embodiment 1.5-2.

As above, according to embodiment 1.6, information on whether or not an HARQ-ACK is included in UCI that is transmitted, can be matched between the base station and the terminal. In the case of embodiment 1.6-1, when an HARQ-ACK is included in UCI, resources specified by ARI are used, so that the base station can determine whether an HARQ-ACK is included in the received PUCCH depending on in which PUCCH resource UCI is received. In the case of embodiment 1.6-2, the PUCCH resource does not change whether or not an HARQ-ACK is included, but the DMRS or CRC scrambling sequence changes, so that the base station can determine whether an HARQ-ACK is included in the received PUCCH depending on how the DMRS or the CRC is scrambled.

In embodiments 1.3 to 1.6, the user terminal may separately encode an HARQ-ACK and a P-CSI, maps the P-CSI to a PUCCH resource, and then map the HARQ-ACK in an over-riding manner. In this case, regardless of whether HARQ-ACK is transmitted from the user terminal or not, the radio base station assumes that HARQ-ACK is included in the PUCCH, so that the radio base station can properly decode P-CSI. Thus, for example, even if the resource specified by RRC and the resource specified by ARI are the same, the radio base station can correctly decode P-CSI. The radio base station similarly performs decoding processing on HARQ-ACKs, and the radio base station can judge whether or not HARQ-ACK is included in the PUCCH depending on whether the CRC is successful (CRC is OK or NG).

Second Embodiment: When Simultaneous PUCCH-PUSCH Transmission is Configured

In accordance with embodiments of the invention, a second aspect of the invention will now be described. The second embodiment relates to a CSI feedback method for use when PUCCH CG is configured for simultaneous PUCCH-PUSCH transmission and PUSCH transmission is performed in P-CSI reporting subframes. When PUSCH transmission is not performed in P-CSI reporting subframes, the first embodiment can be applied.

Embodiment 2.1

In accordance with embodiments of the invention, an aspect of the invention will now be described. Embodiment 2.1 concerns a CSI feedback method for use when UCI contains multiple P-CSIs but does not contain HARQ-ACKs, and PF 3 or new PF is configured for multiple P-CSIs.

Figure 12A:
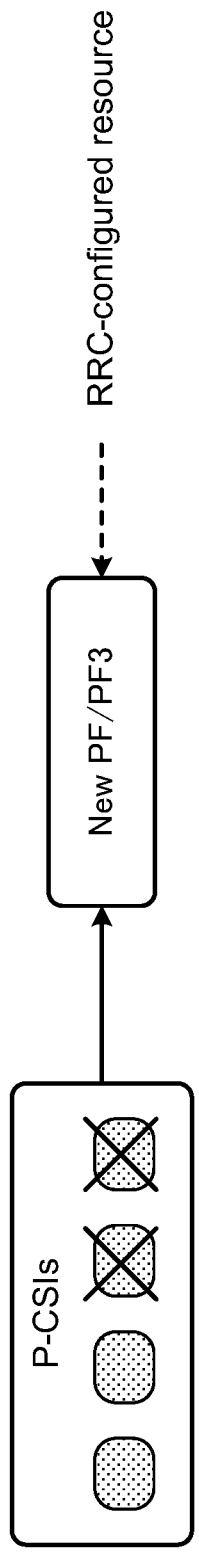
FIGS. 12A and 12B illustrate the resources used to transmit multiple P-CSIs in embodiment 2.1.
Figure 12B:
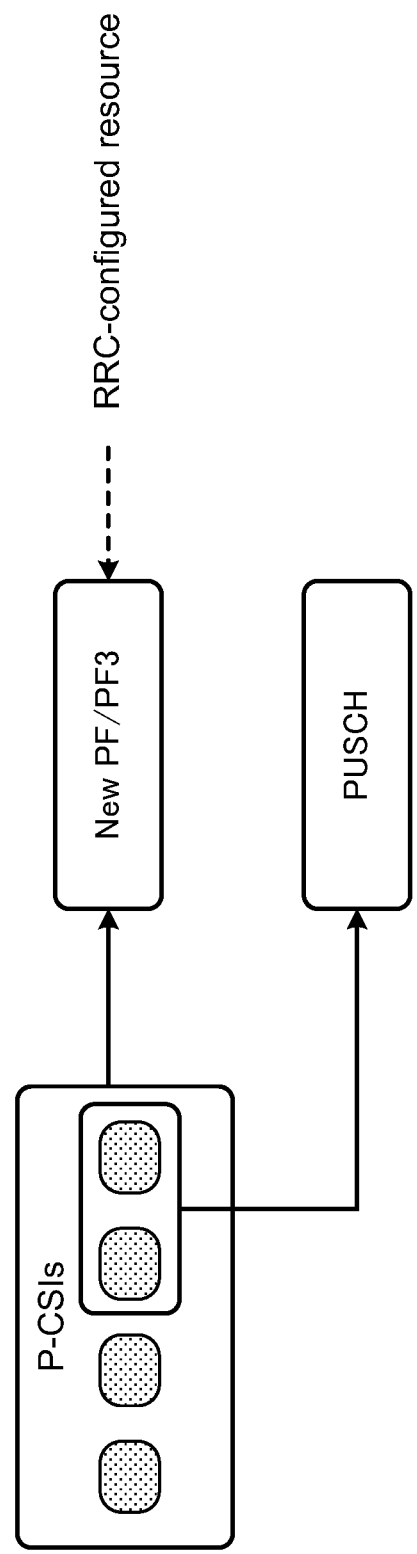

FIG. 12 is a diagram for explaining the resources used to transmit a plurality of P-CSIs in the embodiment 2.1. In embodiment 2.1, radio resources to which PF 3 for multiple P-CSIs can be assigned is configured by RRC signaling. In FIG. 12, two CCs among four CCs' P-CSIs can be transmitted in PF 3 or new PF, the number of CCs of P-CSIs that can be transmitted in PF 3 or new PF is not limited to this.

When the UE recognizes that a plurality of P-CSIs are transmitted in a predetermined subframe, the UE determines the PF to use to transmit a plurality of P-CSIs. Here, similar to the embodiment 1.1, the UE determines the P-CSIs to be included in UCI, taking into consideration the maximum payload size of PF 3 or the new PF.

In embodiment 2.1, for example, among a plurality of P-CSIs, one or two or more P-CSIs with higher priority are transmitted in PF 3 or a new PF and other P-CSIs (that is, lower-priority P-CSIs) may be dropped (embodiment 2.1-1). FIG. 12A is a diagram to show an example of embodiment 2.1-1. In this example, two CCs' P-CSIs out of four CCs' P-CSIs are transmitted in PF 3 or new PF, and the remaining two CCs' P-CSIs, not included in the PUCCH, are dropped.

Also in embodiment 2.1, for example, among a plurality of P-CSIs, one or two or more P-CSIs with higher priority may be transmitted in PF 3 or a new PF, and other P-CSIs may be sent in the PUSCH (piggyback) (embodiment 2.1-2).

FIG. 15 is a diagram to show an example of embodiment 4.2. In this example, two CCs' P-CSIs out of four CCs' P-CSIs are transmitted in PF 3 or new PF, and the remaining two CCs' P-CSIs not included in the PUCCH are transmitted in the PUSCH.

According to embodiment 2.1 above, the UE can transmit P-CSIs of high priority, for example, by using a PUCCH that can secure high quality. Also, in the case of embodiment 2.1-2, P-CSI whose priority is not high can be transmitted in the PUSCH (piggyback), and this reduces the possibility of P-CSI being dropped and increases the frequency at which the base station obtains the channel information report of the terminal.

Embodiment 2.2

In accordance with embodiments of the invention, an aspect of the invention will now be described. Embodiment 2.2 concerns a CSI feedback method for use when UCI contains multiple P-CSIs and one-bit or two-bit HARQ-ACKs and PF 3 or new PF is configured for multiple P-CSIs. In this case, radio resources to which PF 3 or new PF can be assigned are configured by RRC signaling.

In embodiment 2.2, for example, one-bit or two-bit HARQ-ACKs may be transmitted in the PUCCH (PF 1a/1b) and multiple P-CSIs may be transmitted in the PUSCH (all P-CSI transmitted at the same timing) (embodiment 2.2-1).

Also in embodiment 2.2, like embodiment 1.2, multiple P-CSIs and one-bit or two-bit HARQ-ACKs may be sent in PF 3 or new PF with resources configured by RRC signaling (embodiment 2.2-2). In this case, the HARQ-ACK may be used for scrambling as a predetermined DMRS modulation symbol. Alternatively, the plurality of P-CSI bit sequences may be included in the PF data symbol following the HARQ-ACK bit.

Also in embodiment 2.2, multiple P-CSIs and one-bit or two-bit HARQ-ACKs may be sent in separate resources (embodiment 2.2-3). For example, in a subframe in which three UCIs (two P-CSIs and one-bit or two-bit HARQ-ACKs) are transmitted, these three UCIs may be sent using two PUCCH resources and one PUSCH resource. Resources used for transmission of UCI (for example, a combination of PUCCH resource and PUSCH resource) may be determined based on the combination of UCI to be transmitted. For example, the resource may be determined based on the number of P-CSIs (such as the number of CCs and the number of bits) and the number of HARQ-ACKs (such as the number of CCs and the number of bits).

According to embodiment 2.2 above, UCIs can be transmitted using separate codes or resources, so that control can be exerted so that different quality requirements can be achieved.

Embodiment 2.3

In accordance with embodiments of the invention, an aspect of the invention will now be described. Embodiment 2.3 concerns a CSI feedback method for use when UCI contains multiple P-CSIs and multiple HARQ-ACKs, PF 3 is configured for multiple P-CSIs, and PF 3 is configured for multiple HARQ-ACKs. The method of configuring/specifying resources for each PF is the same as in the embodiment 1.3.

Figure 13:
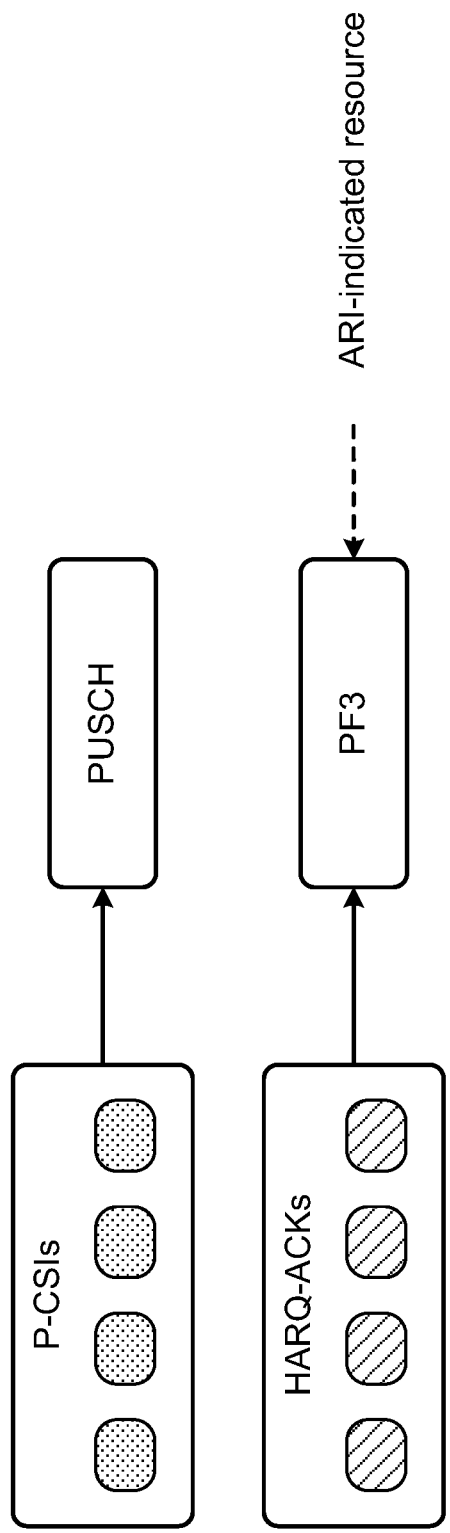
FIG. 13 is a diagram illustrating resources used for transmitting a plurality of P-CSIs and a plurality of HARQ-ACKs in the embodiment 2.3-1.

In Embodiment 2.3, for example, multiple P-CSIs (for example, all P-CSIs to be transmitted at the same timing) may be sent in the PUSCH, multiple HARQ-ACKs may be sent using the PUCCH (PF 3) in HARQ-ACK resources (embodiment 2.3-1). FIG. 13 is a diagram for explaining the resources used for transmitting a plurality of P-CSIs and a plurality of HARQ-ACKs in the embodiment 2.3-1. In the example shown in FIG. 13, four CCs' HARQ-ACKs are transmitted using PF 3 in ARI-specified resources and P-CSIs of four CCs are transmitted in the PUSCH.

Also, in embodiment 2.3, at most one P-CSI and multiple HARQ-ACKs may be sent in HARQ-ACK resources specified in ARI (embodiment 2.3-2). FIG. 14 is a diagram for explaining the resources used for transmitting a plurality of P-CSIs and a plurality of HARQ-ACKs in the embodiment 2.3-2.

Figure 14A:
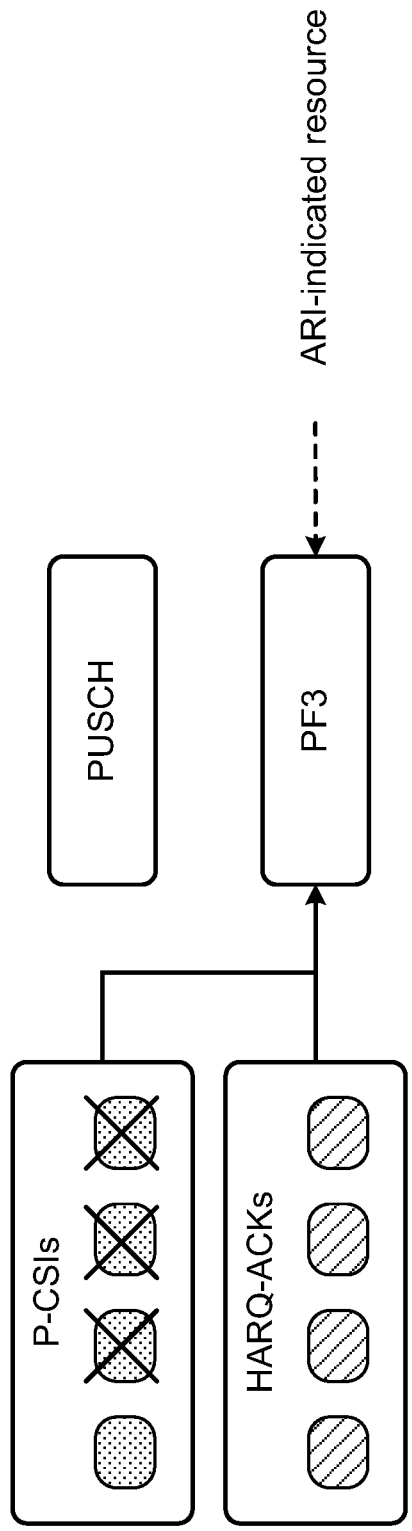
FIGS. 14A and 14B illustrate the resources used to transmit multiple P-CSIs and multiple HARQ-ACKs in embodiment 2.3-2.

In the embodiment 2.3-2, among a plurality of P-CSIs, one or two or more P-CSIs with higher priority are transmitted in PF 3, and other P-CSIs may be dropped. FIG. 14A is a diagram to show an example of embodiment 2.3-2. In this example, among P-CSIs of four CCs, P-CSI of one CC is transmitted in PF 3 and the P-CSIs of the remaining three CCs, not included in the PUCCH, are dropped.

Figure 14B:
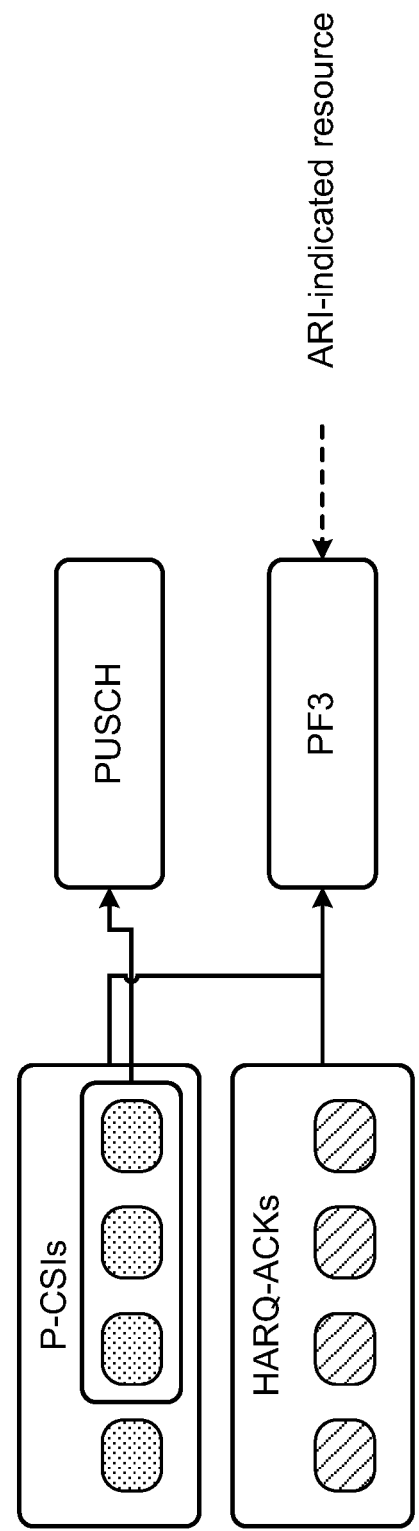

Also, in the embodiment 2.3-2, one or two or more P-CSIs with higher priority among a plurality of P-CSIs may be transmitted in PF 3, and other P-CSIs may be transmitted in the PUSCH (piggyback). FIG. 14B is a diagram showing another example of embodiment 2.3-2. In this example, one CC's P-CSI out of four CCs' P-CSIs is transmitted in PF 3, and the remaining P-CSIs of three CCs not included in the PUCCH are transmitted in the PUSCH.

Also in embodiment 2.3, at most one P-CSI and multiple HARQ-ACKs may be sent in P-CSI resources configured by RRC signaling (embodiment 2.3-3). FIG. 15 is a diagram for explaining the resources used for transmitting a plurality of P-CSIs and a plurality of HARQ-ACKs in the embodiment 2.3-3.

Figure 15A:
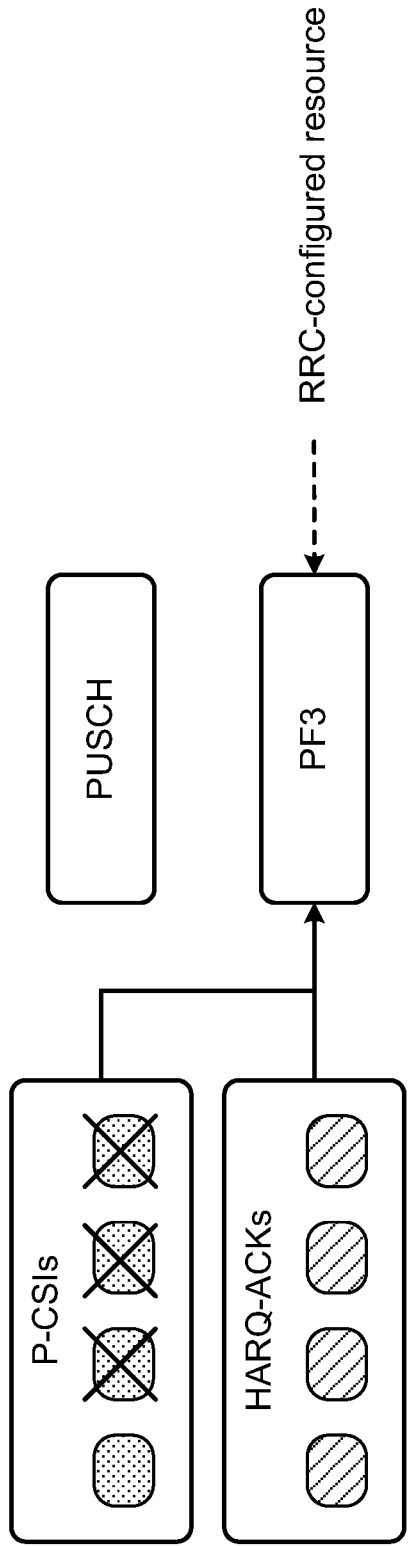
FIGS. 15A and 15B are diagrams illustrating the resources used to transmit multiple P-CSIs and multiple HARQ-ACKs in embodiment 2.3-3.

In embodiment 2.3-3, one or more P-CSIs with higher priority among multiple P-CSIs are transmitted in PF 3, and other P-CSIs may be dropped. FIG. 15A is a diagram to show an example of embodiment 2.3-3. In this example, among the P-CSIs of four CCs, P-CSI of one CC is transmitted in PF 3, and the remaining P-CSIs of three CCs not included in the PUCCH are dropped.

Figure 15B:
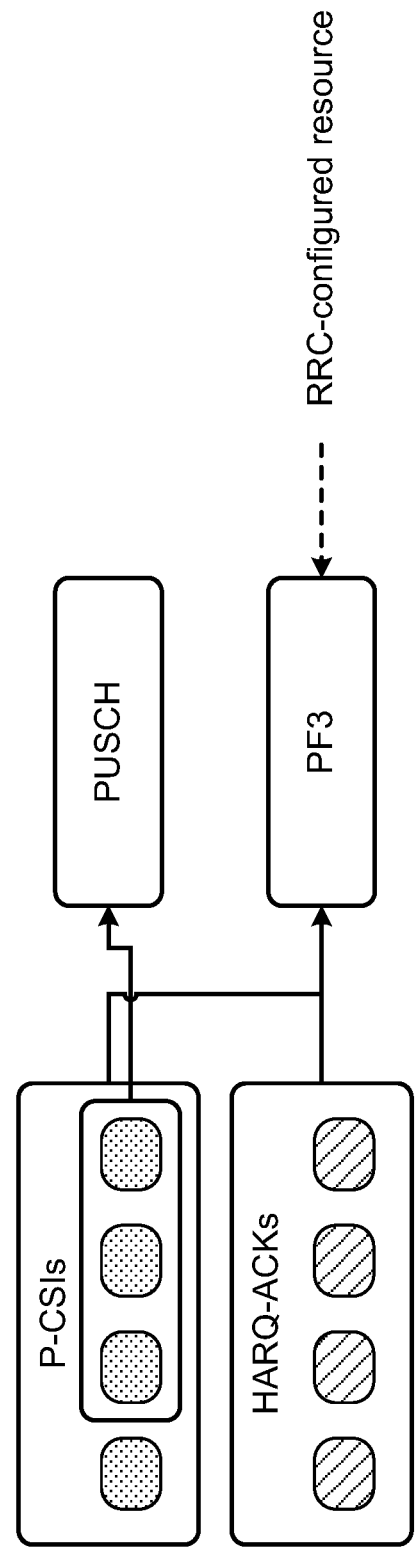

Also in embodiment 2.3-3, among a plurality of P-CSIs, one or two or more P-CSIs with higher priority are transmitted in PF 3, and other P-CSIs may be transmitted in the PUSCH (piggyback). FIG. 15B is a diagram showing another example of embodiment 2.3-3. In this example, among P-CSIs of four CCs, P-CSI of one CC is transmitted in PF 3, and the remaining P-CSIs of three CCs not included in the PUCCH are transmitted in the PUSCH.

In embodiment 2.3-3, as with embodiment 1.3-2, the UE preferably applies scrambling associated with the information (whether an HARQ-ACK is included in UCI that is transmitted) contained in UCI transmitted in PF 3 to the DMRS of PF 3 in resources configured by RRC. That is, different scrambling is applied to the DMRS depending on whether UCI includes multiple P-CSIs and multiple HARQ-ACKs or includes only multiple P-CSIs.

Also in embodiment 2.3, like embodiment 2.2-3, multiple P-CSIs and multiple HARQ-ACKs may be sent in separate resources respectively (embodiment 2.3-4).

According to the embodiment 2.3 above, information on whether or not an HARQ-ACK is included in UCI that is transmitted can be matched between the base station and the terminal. In the case of embodiment 2.3-2, when an HARQ-ACK is included in UCI, resources specified by ARI are used, so that the base station can determine whether an HARQ-ACK is included in the received PUCCH depending on in which PUCCH resource UCI is received. In the case of embodiment 2.3-3, the PUCCH resource does not change even if an HARQ-ACK is included or not, but the DMRS scrambling sequence changes, so that the base station can determine whether an HARQ-ACK is included in the received PUCCH depending on how the DMRS is scrambled.

Embodiment 2.4

In accordance with embodiments of the invention, an aspect of the invention will now be described. Embodiment 2.4 concerns a CSI feedback method for use when UCI includes multiple P-CSIs and multiple HARQ-ACKs, PF 3 is configured for multiple P-CSIs, and a new PF is configured for multiple HARQ-ACKs. The method of configuring/specifying resources for each PF is the same as in the embodiment 1.4.

In the embodiment 2.4, for example, a plurality of HARQ-ACKs may be transmitted using a PUCCH (new PF) as a resource for HARQ-ACK and multiple P-CSIs (for example, all P-CSIs transmitting at the same timing) may be transmitted in the PUSCH (embodiment 2.4-1).

Also in embodiment 2.4, like embodiment 1.4, a plurality of P-CSIs and a plurality of HARQ-ACKs may be transmitted in a new PF, in resource HARQ-ACK resources specified by ARI (embodiment 2.4-2).

In embodiment 2.4-2, one or two or more P-CSIs with higher priorities among a plurality of P-CSIs may be transmitted in a new PF, and other P-CSIs may be dropped. Also in embodiment 2.4-2, among a plurality of P-CSIs, one or two or more P-CSIs with higher priority are transmitted in a new PF and other P-CSIs may be transmitted in the PUSCH (piggyback).

Also in embodiment 2.4, like embodiment 2.2-3 multiple P-CSIs and multiple HARQ-ACKs may be sent in separate resources (embodiment 2.4-3).

According to the embodiment 2.4 above, it is possible to match the information as to whether an HARQ-ACK is included in UCI that is transmitted, between the base station and the terminal. In the case of embodiment 2.4-2, when an HARQ-ACK is not included in UCI, resources specified by RRC are used, and, when an HARQ-ACK is included in UCI, resources specified by ARI are used, so that the base station can determine whether an HARQ-ACK is included in the received PUCCH depending on in which PUCCH resource UCI is received.

Embodiment 2.5

In accordance with embodiments of the invention, an aspect of the invention will now be described. Example 2.5 relates to a CSI feedback method for use when UCI contains multiple P-CSIs and multiple HARQ-ACKs, a new PF is configured for multiple P-CSIs, and PF 3 is configured for multiple HARQ-ACKs. The method of configuring/specifying resources for each PF is the same as in embodiment 1.5.

In the embodiment 2.5, for example, multiple HARQ-ACKs may be sent in the PUCCH (PF 3) using HARQ-ACK resources, and multiple P-CSIs (for example, All P-CSI to be transmitted at the same timing) may be sent in the PUSCH (embodiment 2.5-1).

Also in embodiment 2.5, like embodiment 1.5-1, up to one P-CSI and multiple HARQ-ACKs may be sent using PF 3 (embodiment 2.5-2), using HARQ-ACK resources specified by ARI.

Also in embodiment 2.5, like embodiment 1.5-2, multiple P-CSIs and multiple HARQ-ACKs may be sent in a new PF using P-CSI resources configured by RRC signaling (embodiment 2.5-3). The scrambling sequence used in the new PF is the same as in embodiment 1.5-2.

In the embodiment 2.5-2 and the embodiment 2.5-3, among a plurality of P-CSIs, one or two or more P-CSIs with higher priority are transmitted in PF 3 or new PF, and other P-CSIs may be dropped. Also, in the embodiment 2.5-2 and the embodiment 2.5-3, among a plurality of P-CSIs, one or two or more P-CSIs with higher priority are transmitted in PF 3 or new PF, and other P-CSIs may be transmitted in the PUSCH (piggyback).

Also in embodiment 2.5, like embodiment 2.2-3, multiple P-CSIs and multiple HARQ-ACKs may be sent in separate resources (embodiment 2.5-4).

As described above, according to the embodiment 2.5, the information as to whether or not HARQ-ACK is included in UCI that is transmitted can be matched between the base station and the terminal. In the case of embodiment 2.5-2, when an HARQ-ACK is included in UCI, resources specified by ARI are used, so that the base station can determine whether an HARQ-ACK is included in the received PUCCH depending on in which PUCCH resource UCI is received. In the case of embodiment 2.5-3, even if an HARQ-ACK is included or not, the PUCCH resource does not change, but the DMRS or CRC scrambling sequence changes, so that the base station can determine whether an HARQ-ACK is included in the received PUCCH depending on how the DMRS or the CRC is scrambled.

Embodiment 2.6

In accordance with embodiments of the invention, an aspect of the invention will now be described. Embodiment 2.6 concerns a CSI feedback method for use when UCI includes multiple P-CSIs and multiple HARQ-ACKs, a new PF is configured for multiple P-CSIs, and a new PF is configured for multiple HARQ-ACKs. The method of configuring/specifying resources for each PF is the same as in the embodiment 1.6.

In embodiment 2.6, for example, a plurality of HARQ-ACKs are resources for HARQ-ACK and are transmitted using PUCCH (new PF), and multiple P-CSIs (for example, all P-CSI to be transmitted at the same timing) may be transmitted in the PUSCH (embodiment 2.6-1).

Also in embodiment 2.6, like embodiment 1.4, multiple P-CSIs and multiple HARQ-ACKs may be transmitted using a new PF in HARQ-ACK resources specified by ARI (embodiment 2.6-2).

Also in embodiment 2.6, like embodiment 1.5-2, multiple P-CSIs and multiple HARQ-ACKs may be transmitted using a new PF in P-CSI resources configured by RRC signaling (embodiment 2.6-3). The scrambling sequence used in the new PF is the same as in embodiment 1.5-2.

In the embodiment 2.6-2 and the embodiment 2.6-3, among a plurality of P-CSIs, one or two or more P-CSIs with higher priority may be transmitted in a new PF and other P-CSIs may be dropped. Also, in the embodiment 2.6-2 and the embodiment 2.6-3, among a plurality of P-CSIs, one or two or more P-CSIs with higher priority may be transmitted in a new PF, and other P-CSIs may be transmitted in the PUSCH (piggyback).

Also in embodiment 2.6, like embodiment 2.2-3, multiple P-CSIs and multiple HARQ-ACKs may be sent in separate resources (embodiment 2.6-4).

According to embodiment 2.6 above, information on whether or not an HARQ-ACK is included in UCI that is transmitted, can be matched between the base station and the terminal. In the case of embodiment 2.6-2, when an HARQ-ACK is included in UCI, resources specified by ARI are used, so that the base station can determine whether an HARQ-ACK is included in the received PUCCH depending on in which PUCCH resource UCI is received. In the case of embodiment 2.6-3, even if an HARQ-ACK is included or not, the PUCCH resource does not change, but the DMRS or CRC scrambling sequence changes, so that the base station can determine whether an HARQ-ACK is included in the received PUCCH depending on how the DMRS or the CRC is scrambled.

In the embodiment 2.3-2.6, the user terminal may separately encode an HARQ-ACK and a P-CSI, map the P-CSI to a PUCCH resource, and then map the HARQ-ACK to override the same PUCCH resource. In this case, the radio base station assumes that HARQ-ACK is included in the PUCCH irrespective of whether or not the user terminal is transmitting the HARQ-ACK, and, as a result, the radio base station can properly decode the P-CSI. Thus, for example, even if the resource specified by the RRC is the same as the resource specified by the ARI, the radio base station can correctly decode the P-CSI. The radio base station also carries out the same decoding process for HARQ-ACK, and the radio base station can judge whether HARQ-ACK was included in the PUCCH depending on whether the CRC result is OK or NG.

Note that information available in each embodiment may be reported from the eNB to the UE using higher layer signaling (for example, RRC signaling) or downlink control information (for example, DCI or a combination thereof). In addition, the UE may store the information in advance.

Information available for each embodiment may include, for example, at least one of information on the configuration of the new PF (coding scheme, number of DMRS symbols, data symbol mapping method, radio resources, etc.), information on CSI resources overridden by HARQ-ACK (embodiment 1.2), and information for switching the method described in each embodiment. The UE may determine the configuration of the new PF and the control of each embodiment based on the information.

In addition, the UE may report UE capability information to the eNB indicating that the UE can transmit multiple P-CSIs in one TTI (one subframe). Then the eNB may be configured to report the above information to the UE that has reported the UE capability information. For example, both UE capability information indicating that CA with more than 5 CCs can be set and UE capability information indicating that multiple P-CSIs can be transmitted in 1 TTI are reported from one UE to the eNB, and the eNB may report the above information to the UE.

Also, in each of the above embodiments, an example in which an uplink signal is transmitted with an SC-FDMA symbol is shown, but this is not limiting. For example, the present invention can be applied even when uplink signals are transmitted in other symbol formats such as OFDMA (Orthogonal Frequency Division Multiple Access) symbols.

Note that the radio communication methods of the above-described embodiments may be applied individually or may be applied in combination.

(Radio Communication System)

Now, the structure of the radio communication system according to an embodiment of the present invention will be described below. In this radio communication system, communication is performed using any one of or a combination of the radio communication methods according to the above embodiments of the present invention.

Figure 16:
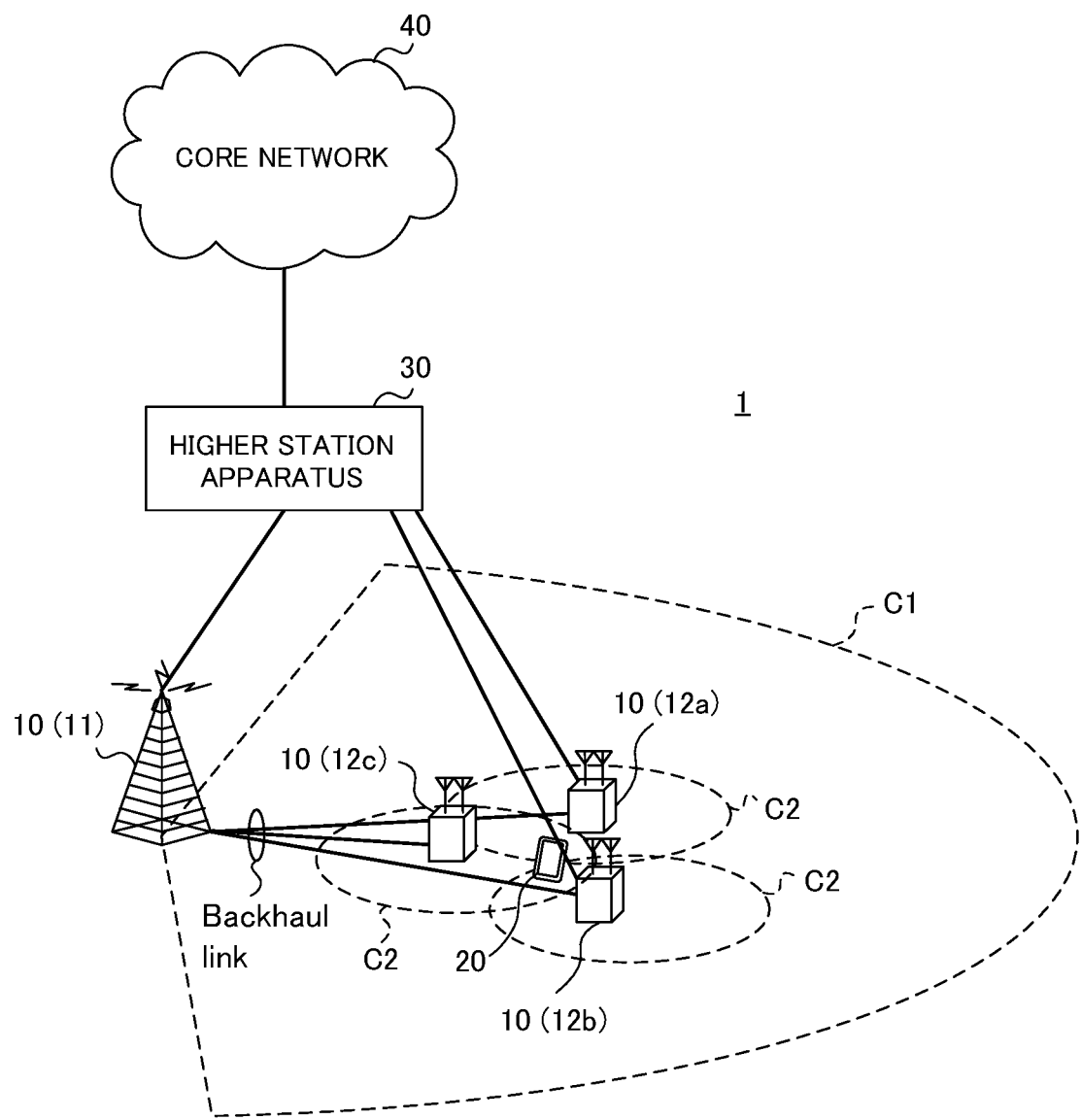
FIG. 16 is a diagram to show an example of a schematic structure of a radio communication system in accordance with embodiments of the invention.

FIG. 16 is a diagram to show an example of a schematic structure of a radio communication system according to embodiments of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE" (Long Term Evolution), "LTE-A" (LTE-Advanced), "LTE-B" (LTE-Beyond), "SUPER 3G," "IMT-Advanced," "4G" (4th generation mobile communication system), "5G" (5th generation mobile communication system), "FRA" (Future Radio Access), "New-RAT" (Radio Access Technology) and so on, or may be seen as a system to implement these.

The radio communication system 1 shown in FIG. 12 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Further, the user terminal 20 may apply CA or DC using a plurality of cells (CC) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. The PDSCH may be referred to as a "down link data channel." User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols for use for the PDCCH is communicated by the PCFICH. Delivery acknowledgment information (also referred to as retransmission control information, HARQ-ACK, ACK/NACK, etc.) of HARQ (Hybrid Automatic Repeat reQuest) for PUSCH is transmitted by PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Furthermore, uplink control information (UCI) such as downlink radio quality information (CQI: Channel Quality Indicator), delivery acknowledgement signals (ACK/NACK) and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that, DMRSs may be referred to as "user terminal-specific reference signals" (UE-specific Reference Signals). Also, the reference signals to be communicated are by no means limited to these.

(Radio Base Station)

Figure 17:
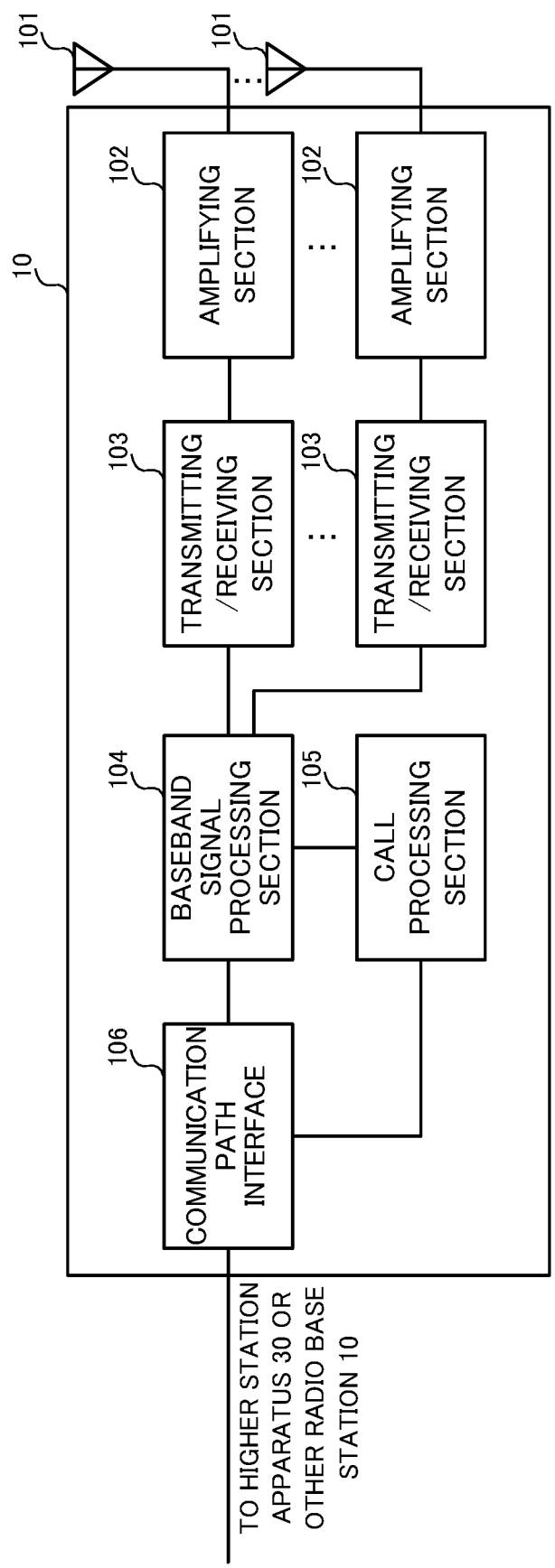
FIG. 17 is a diagram to show an example of an overall structure of a radio base station in accordance with embodiments of the invention.

FIG. 17 is a diagram to show an example of an overall structure of a radio base station according to embodiments of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface) m such as optical fiber, the X2 interface).

Note that the transmitting/receiving section 103 transmits a reference signal (for example, CRS, CSI-RS, etc.) for measuring the channel state, to the user terminal 20. The transmitting/receiving section 103 transmits DCI related to data transmission and/or reception to the user terminal 20. For example, the transmitting/receiving section 103 may transmit downlink shared channel (PDSCH) reception command information (also referred to as DL grant, DL assignment, etc.) for a predetermined CC. Further, the transmitting/receiving section 103 may transmit uplink shared channel (PUSCH) transmission command information (also referred to as UL grant) for a predetermined CC. Further, after the DL grant is transmitted, the transmitting/receiving section 103 transmits downlink data (PDSCH) at a predetermined timing.

Further, the transmitting/receiving section 103 receives P-CSIs of a plurality of CCs from the user terminal 20 at the timing determined by the control section 301 to be described later. Further, at the timing determined by the control section 301, the transmitting/receiving section 103 receives the HARQ-ACK for the downlink data transmitted on the downlink shared channel (PDSCH). Further, at the timing determined by the control section 301, the transmitting/receiving section 103 receives the uplink data on the uplink shared channel (PUSCH).

Figure 18:
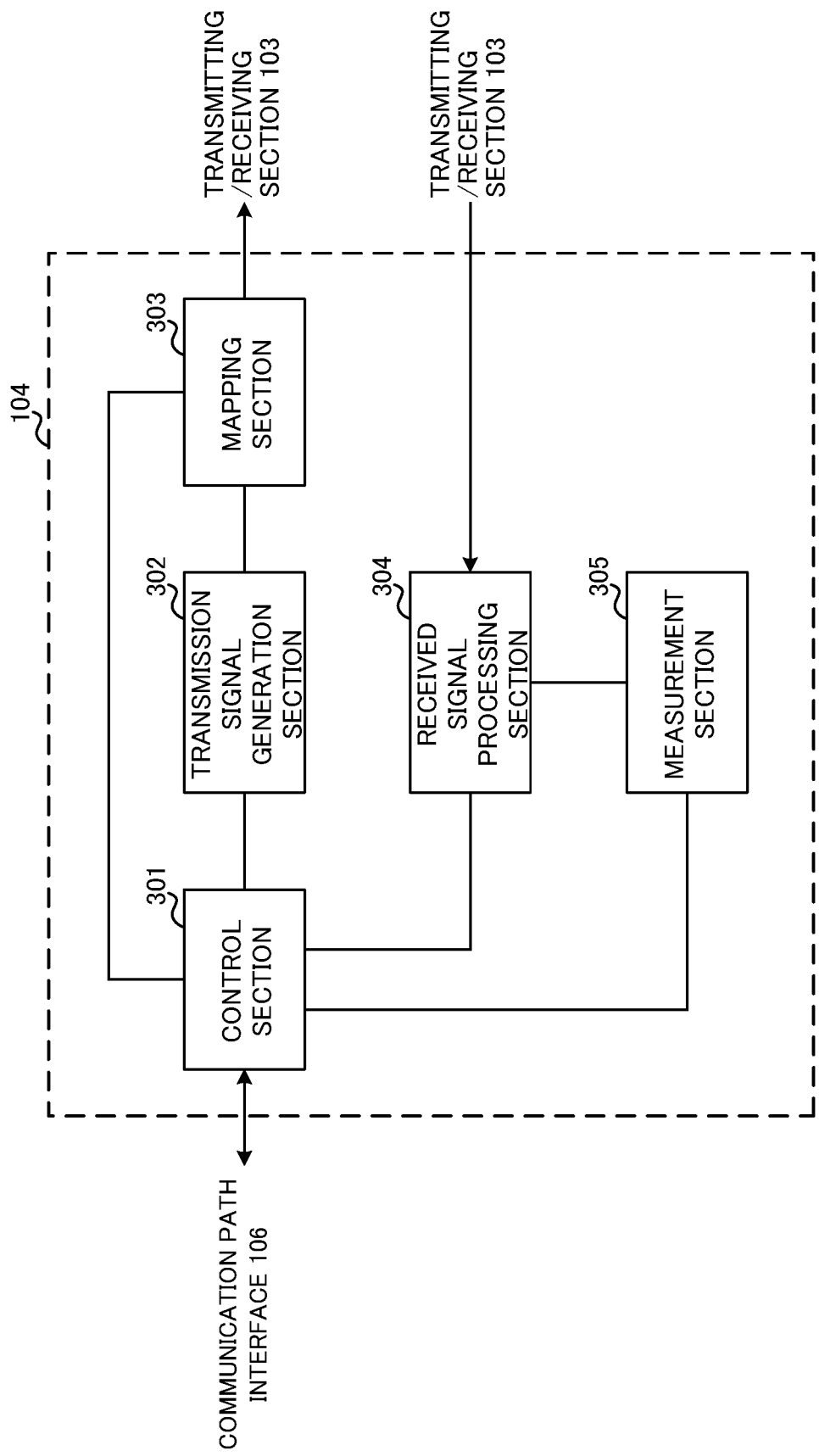
FIG. 18 is a diagram to show an example of a functional structure of a radio base station in accordance with embodiments of the invention.

FIG. 18 is a diagram to show an example of functional structure of a radio base station according to embodiments of the present invention. Note that, although FIG. 18 primarily shows functional blocks that pertain to characteristic parts of one or more embodiments, the radio base station 10 has other functional blocks that are necessary for radio communication as well. As shown in FIG. 14, the baseband signal processing section 104 has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of downlink reference signals such as synchronization signals (the PSS (Primary Synchronization Signal) and the SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

When the control section 301 acquires UCI received from the user terminal 20 from the received signal processing unit 304, based on this UCI, the control section 301 performs data retransmission control and scheduling control on the user terminal 20. For example, when HARQ-ACK is acquired from the received signal processing unit 304, the control section 301 determines whether it is necessary to perform retransmission to the user terminal 20, and performs control so that retransmission processing is performed when retransmission is necessary.

Also, based on whether or not the simultaneous transmission of an uplink control channel and an uplink shared channel is permitted in the predetermined user terminal 20, and based on the number of HARQ-ACKs (for example, the number of bits, the number of CCs, etc.) scheduled to be transmitted simultaneously with a plurality of P-CSIs, the control section 301 performs control so that at least a part of a plurality of P-CSIs and HARQ-ACKs are received using a specific PF (in the same TTI).

For example, when simultaneous transmission of an uplink control channel and an uplink shared channel is not permitted to a predetermined user terminal 20, in subframe in which P-CSI reporting is received, PUCCH resources for receiving a plurality of P-CSIs and/or one or more bits of HARQ-ACKs from a predetermined user terminal 20, decoding to be applied to a specific PF, and P-CSI are controlled (selected) by the control section 301 using the radio communication method described in the first embodiment above. For example, a specific PF for receiving multiple P-CSIs may be PF 3, a new PF, etc.

When simultaneous transmission of an uplink control channel and an uplink shared channel is permitted, in the subframes in which P-CSI reporting is received, the control section 301 controls (selects) the PUCCH resources for receiving a plurality of P-CSIs and/or one or more bits of HARQ-ACKs from a predetermined user terminal 20, decoding applied to a specific PF and P-CSI included in the PUCCH, using the radio communication method described in the second embodiment.

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI: Channel State Information) reported from each user terminal.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User Terminal)

Figure 19:
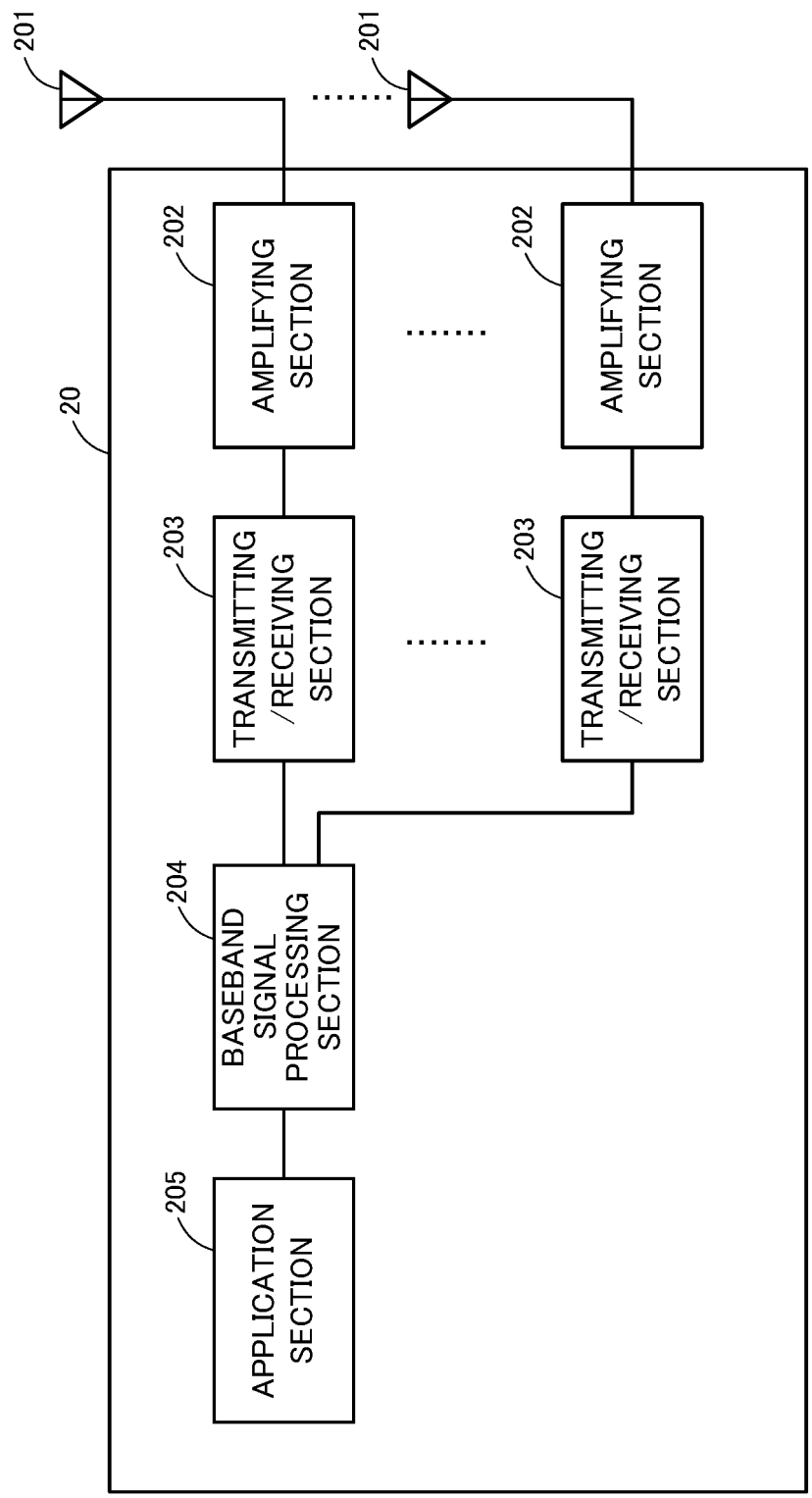
FIG. 19 is a diagram to show an example of an overall structure of a user terminal in accordance with embodiments of the invention.

FIG. 19 is a diagram to show an example of an overall structure of a user terminal according to one or more embodiments of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving sections 203, and output to the baseband signal processing section 204. The transmitting/receiving section 203 can be constituted by a transmitters/receiver, a transmitting/receiving circuit or a transmitting/receiving device that can be described based on common understanding of the technical field to which the present invention pertains. Note that the transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving section 203 receives a reference signal for measuring the channel state from the radio base station 10 (for example, CRS, CSI-RS, etc.). The transmitting/receiving section 203 receives DCI related to data transmission and/or reception from the radio base station 10. For example, the transmitting/receiving section 203 may receive a DL grant for a predetermined CC. Further, the transmitting/receiving section 203 may receive the UL grant for the predetermined CC. Further, the transmitting/receiving section 203 receives downlink data (PDSCH) at a timing determined based on the DL grant.

Further, at the timing determined by the control section 401, the transmitting/receiving section 203 transmits P-CSIs of a plurality of CCs to the radio base station 10. Further, at the timing determined by the control section 401, the transmitting/receiving section 203 transmits HARQ-ACK for downlink data transmitted in the downlink shared channel (PDSCH). In addition, at the timing determined by the control section 401 based on the UL grant, the transmitting/receiving section 203 transmits the uplink data on the uplink shared channel (PUSCH).

Figure 20:
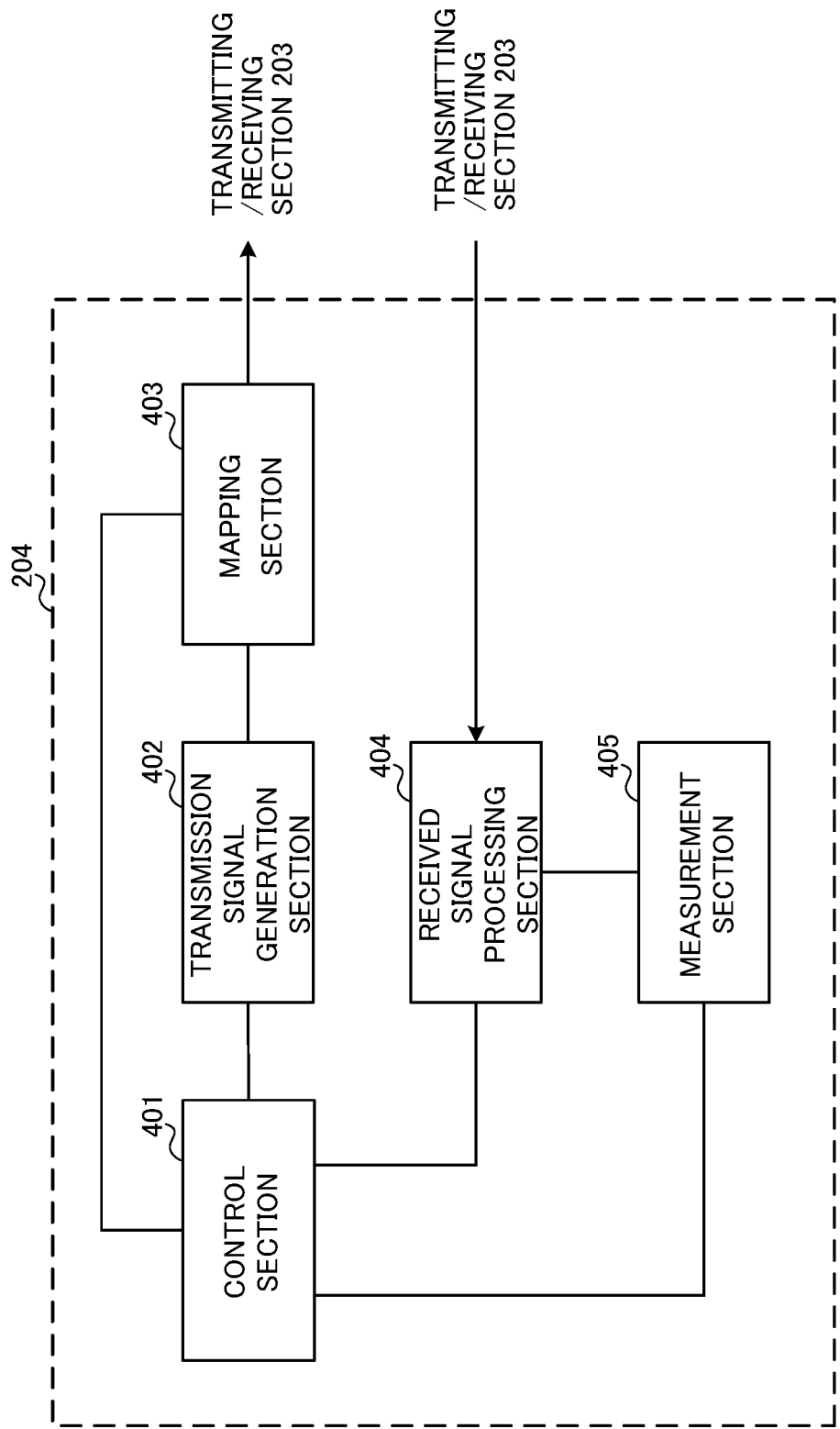
FIG. 20 is a diagram to show an example of a functional structure of a user terminal in accordance with embodiments of the invention.

FIG. 20 is a diagram to show an example of a functional structure of a user terminal according to one or more embodiments of the present invention. Note that, although FIG. 20 primarily shows functional blocks that pertain to characteristic parts of one or more embodiments, the user terminal 20 has other functional blocks that are necessary for radio communication as well. As shown in FIG. 16, the baseband signal processing section 204 provided in the user terminal 20 has a control section 401, a transmission signal generation section (generation section) 402, a mapping section 403, a received signal processing section 404 and a decision section 405.

The control section 401 controls the whole of the user terminal 20. For the control section 401, a controller, a control circuit or a control device that can be described based on common understanding of the technical field to which the present invention pertains can be used.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

To be more specific, the control section 401 generates a periodic CSI report (P-CSI report) based on the channel state of each CC output from the measurement section 405 and feeds this back to the radio base station 10. Also, based on whether or not simultaneous transmission of an uplink control channel and an uplink shared channel is permitted, and based on the number of HARQ-ACKs (for example, the number of bits, the number of CCs, etc. may be used) scheduled to be transmitted simultaneously with multiple P-CSIs, the control section 401 performs control so that at least a part of a plurality of P-CSIs and HARQ-ACKs are transmitted using a specific PF (the same TTI).

Based on whether or not simultaneous transmission of an uplink control channel and an uplink shared channel is permitted, and based on the number of HARQ-ACKs (for example, the number of bits, the number of CCs, etc.) scheduled to be transmitted at the same time (in the same TTI) with a plurality of P-CSIs, the control section 401 performs control so that at least a part of a plurality of P-CSIs and HARQ-ACKs are transmitted using a specific PF.

When simultaneous transmission of an uplink control channel and an uplink shared channel is not permitted, in subframes in which P-CSIs are reported, using the radio communication method described in the above first embodiment, the control section 401 controls PUCCH resources for transmitting a plurality of P-CSIs and/or one or more bits of HARQ-ACKs, encoding to be applied to a specific PF, P-CSI to be dropped, and so on. For example, a specific PF that transmits a plurality of P-CSIs may be PF 3, new PF, or the like.

When simultaneous transmission of an uplink control channel and an uplink shared channel is permitted, in subframes in which P-CSIs are reported, using the radio communication method described in the second embodiment, the control section 401 controls the PUCCH and/or PUSCH resources for transmitting a plurality of P-CSIs and/or one or more bits of HARQ-ACKs, encoding to be applied to a specific PF and the P-CSIs to be dropped.

For example, multiple HARQ-ACKs needs to be transmitted in a subframe where P-CSI is reported, the control section 401 may perform control so that either a first PF for multiple P-CSIs using resources configured by RRC signaling or a second PF for multiple HARQ-ACKs using resources specified by ARI included in DCI to schedule PDSCH corresponding to these HARQ-ACKs (for example, DL grant) is used as a specific PF.

The transmission signal generating section 402 (generation section) generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission information generating section 402 generates uplink control signals such as delivery acknowledgement signals (HARQ-ACKs), channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generating section 402 to radio resources based on commands from the control section 401, and output the result to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. For example, the measurement section 405 may measure channel states of each configured CC using a predetermined reference signal (for example, CRS, CSI-RS, etc.). The measurement results may be output to the control section 401.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to embodiments of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "frequency carriers," "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideB and), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A user terminal comprising:
    a transmitter that transmits uplink control information (UCI); and
    a processor executes control to transmit at least a part of the UCI by using a specific Physical Uplink Control Channel (PUCCH) format (PF),
    wherein, when the UCI includes multiple periodic channel state information (P-CSIs) and multiple Hybrid Automatic Repeat reQuest Acknowledgments (HARQ-ACKs), the processor controls to transmit the UCI by using a resource designated by downlink control information and a second PF having a greater capacity than PF 3, and
    wherein, when the UCI includes multiple P-CSIs, does not include HARQ-ACK, and a resource of the PF of large capacity is configured for multiple P-CSI by RRC (Radio Resource Control) signaling, the control section controls to transmit the UCI by using the resource configured for multiple P-CSIs and the PF of large capacity.

2. The user terminal according to claim 1, wherein, when the UCI includes P-CSI, the processor controls to transmit the UCI including at least one P-CSI that is selected from multiple P-CSIs based on a given priority rule, by using the second PF.

3. The user terminal according to claim 1, wherein, when the UCI includes multiple P-CSIs, 1-bit or 2-bit HARQ-ACK, and simultaneous PUCCH and Physical Uplink Shared Channel (PUSCH) transmission is configured, the processor controls to transmit the HARQ-ACK by the PUCCH and to transmit the multiple P-CSIs by the PUSCH.

4. A radio communication method for a user terminal comprising:
    transmitting uplink control information (UCI); and
    controlling to transmit at least a part of the UCI by using a first Physical Uplink Control Channel (PUCCH) format (PF),
    wherein in the step of controlling, when the UCI includes multiple periodic channel state information (P-CSIs) and multiple Hybrid Automatic Repeat reQuest Acknowledgments (HARQ-ACKs), the user terminal controls to transmit the UCI by using a resource designated by downlink control information and a second PF having a greater capacity than PF 3, and
    wherein, in the step of controlling, when the UCI includes multiple P-CSIs, does not include HARQ-ACK, and a resource of the PF of large capacity is configured for multiple P-CSIs by RRC (Radio Resource Control) signaling, the user terminal controls to transmit the UCI by using the resource configured for multiple P-CSIs and the PF of large capacity.

* * * * *